US012561227B1

(12) United States Patent
Kandwal et al.

(10) Patent No.: US 12,561,227 B1
(45) Date of Patent: Feb. 24, 2026

(54) APPLICATION TO STREAMLINE DEBUGGING

(71) Applicant: Palantir Technologies Inc., Denver, CO (US)

(72) Inventors: Hemang Kandwal, London (GB); Till Kern, Munich (DE); Xinyi Fu, London (GB); Rajdeep Singh Dosanjh, Coventry (GB); Cathleen Jia, San Jose, CA (US)

(73) Assignee: Palantir Technologies Inc., Denver, CO (US)

( * ) Notice: Subject to any disclaimer, the term of this patent is extended or adjusted under 35 U.S.C. 154(b) by 109 days.

(21) Appl. No.: 18/230,017

(22) Filed: Aug. 3, 2023

Related U.S. Application Data

(60) Provisional application No. 63/472,340, filed on Jun. 11, 2023.

(51) Int. Cl.
G06F 9/44 (2018.01)
G06F 11/362 (2025.01)

(52) U.S. Cl.
CPC ................................ G06F 11/3636 (2013.01)

(58) Field of Classification Search
CPC ..................................................... G06F 11/3636
See application file for complete search history.

(56) References Cited

U.S. PATENT DOCUMENTS

| | | | |
|---|---|---|---|
| 2001/0049682 A1* | 12/2001 | Vincent ................. | G06F 16/284 |
| 2002/0087950 A1* | 7/2002 | Brodeur ............. | G06F 11/3636 |
| | | | 717/124 |
| 2020/0264968 A1* | 8/2020 | Chen ................... | G06F 11/3636 |
| 2023/0229413 A1* | 7/2023 | Basu ......................... | G06F 8/71 |
| 2023/0252161 A1* | 8/2023 | Bilgin .................... | G06F 8/427 |
| | | | 726/22 |

* cited by examiner

*Primary Examiner* — Hang Pan
(74) *Attorney, Agent, or Firm* — Sheppard Mullin Richter & Hampton LLP

(57) ABSTRACT

Computing systems, methods, and non-transitory storage media are provided for receiving a script to be executed, in response to the script being in a non-executable format, converting the script into an executable script, receiving one or more breakpoints corresponding to the executable script, generating a window to illustrate one or more dependencies among components corresponding to the breakpoints, receiving an input regarding a correction at a breakpoint, and executing the executable script or a portion of the executable script according to the received input.

17 Claims, 17 Drawing Sheets

1600

Processor(s)
1604

Network
Interface(s)
1618

Bus
1602

Main
Memory
1606

ROM
1608

Storage
1610

Display
1612

Input
Device(s)
1614

Cursor
Control
1616

APPLICATION TO STREAMLINE DEBUGGING

CROSS REFERENCE TO RELATED APPLICATIONS

This application claims the benefit under 35 U.S.C. § 119(e) of U.S. Provisional Application Ser. No. 63/472,340, filed Jun. 11, 2023, the content of which is hereby incorporated by reference in its entirety.

FIELD OF THE INVENTION

This disclosure relates to approaches of streamlining resolution of errors.

BACKGROUND

An increase in capabilities and complexity of applications can be attributed to a sheer number and variety of components such as widgets, functions, queries, and events, and dependencies between such components. This increase in complexity has been a catalyst that has triggered an increase of errors or bugs within the applications. Many of these errors may be caused by humans. An inability to efficiently resolve errors or bugs has become a bottleneck preventing efficient execution of applications. Thus, the ability to leverage and harness the increased capabilities of applications has been frustrated due to the current limitations in error resolution.

SUMMARY

Various examples of the present disclosure can include computing systems configured to perform, methods, and non-transitory computer readable media storing instructions that, when executed by the one or more processors, cause the system to perform: receiving a script to be executed; in response to the script being in a non-executable format, converting the script into an executable script, wherein the executable script is of an executable format; receiving one or more breakpoints corresponding to the executable script; generating a window to illustrate one or more dependencies among components corresponding to the breakpoints; receiving an input regarding a correction at a breakpoint; and executing the executable script or a portion of the executable script according to the received input.

In some examples, each of the breakpoints correspond to a widget, a function, an argument, a variable, a query, and/or an event.

In some examples, if a breakpoint corresponds to a variable, the executable script pauses or terminates at the breakpoint upon the variable being read into, written into, or changed in value.

In some examples, the computing system is associated with one or more machine learning components, and the one or more machine learning components further perform predicting one or more components attributed to an error at a breakpoint and predicting one or more specific fixes to the error at the breakpoint.

In some examples, wherein the machine learning components include a large language model (LLM).

In some examples, the window comprises multiple tabs, and the instructions further cause the computing system to perform: displaying, on a same tab as a tab on which the dependencies are displayed or on a different tab, statuses or values of data being transformed at the one or more breakpoints.

In some examples, the dependencies among the components comprise data inputs and data outputs at each of the components.

In some examples, the instructions further cause the computing system to perform: receiving an update to the script; and in response to receiving the update to the script, generating an updated window to illustrate one or more updated dependencies.

In some examples, the window comprises multiple tabs; the dependencies are displayed or populated within a first tab; and a second tab, upon being selected, causes one or more panels to be populated, the one or more panels receiving one or more inputs to trigger actions by events and receiving definitions for the events.

In some examples, the panels comprise first panels; and a third tab, upon being selected, causes one or more second panels to be populated, the one or more second panels receiving one or more inputs to create or construct an object set, and display the object set in a tabular format, wherein the object set is defined based on an object type and additional filter criteria.

In some examples, a fourth tab, upon being selected, causes one or more fourth panels to be populated, wherein the fourth panels receive a dataset to be imported.

These and other features of the computing systems, methods, and non-transitory computer readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIG. 1A may also be applicable to any of FIGS. 1B, 2-13, and vice versa.

FIG. 8 illustrates a panel displayed upon selection of a datasets tab. FIG. 9 illustrates a panel displayed upon selection of a queries tab. FIG. 10 illustrates a panel displayed upon selection of a functions tab. FIG. 11 illustrates a panel displayed upon selection of a platform tab or an object tab. FIG. 11 illustrates a panel displayed upon selection of a platform tab or an events tab.

DETAILED DESCRIPTION

In some current implementations, a debugging mechanism provides an output that results from an execution of a program, a portion of a program, or a function, up to a breakpoint. However, such a limited output may be devoid of a depiction of contextual information such as statuses and/or values of components such as widgets, functions, arguments, queries, and/or events, and dependencies among such components as well as other portions of the program and/or other breakpoints. As a result, this limited output provides an incomplete perspective of a program being executed. For example, this limited output lacks a data lineage up to a point of execution. These limitations may hinder efforts to resolve errors and/or modify a program.

To resolve these limitations, a computing system may retrieve and organize relevant contextual information regarding execution of a program up to a breakpoint. The computing system may generate an output of a depiction of dependencies regarding components being executed, and the relevant contextual information, including statuses and/or values of components such as widgets, functions, arguments, variables, queries, and/or events, and dependencies among such components as well as other portions of the program and/or other breakpoints. Moreover, the output may include statuses, values, and/or a data lineage including updates to data being transformed or manipulated. In some examples, widgets may include functions and/or be a visual representation of functions, which are manifested as logical representations. Widgets may include components to present charts, maps, tables, and other visualizations of data.

Figure 1A:
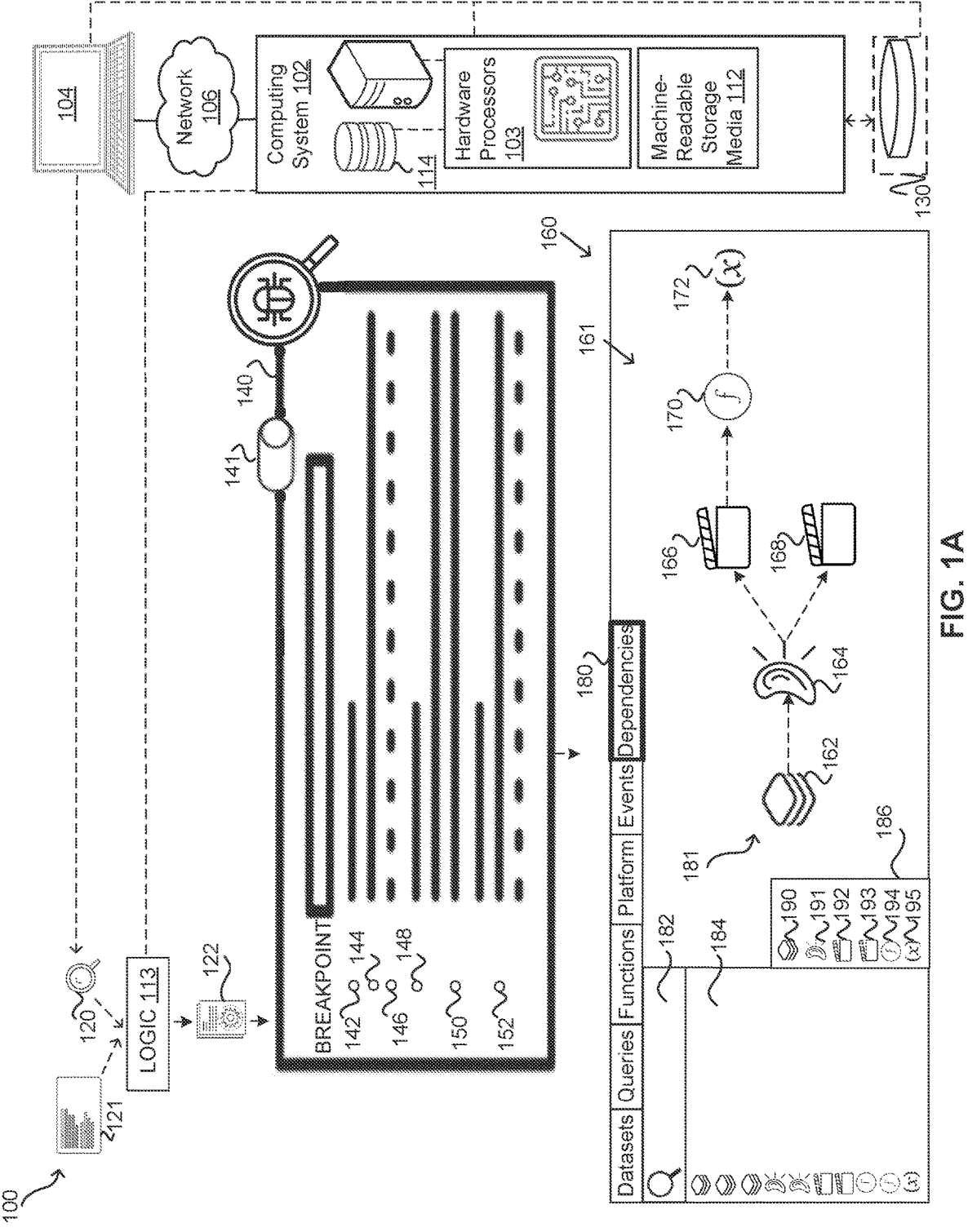
FIG. 1A illustrates an example implementation of a computing system that generates and/or displays a window or interface (hereinafter "window") illustrating details of a debugging process, such as dependencies among components corresponding to breakpoints.

FIG. 1A illustrates an example implementation or scenario (hereinafter "implementation") 100, of a computing system 102 that receives a request to perform execution on a script, transforms the script into an executable format, receives or obtains one or more breakpoints, executes the transformed script up to a breakpoint, and pauses or terminates execution at that breakpoint. The computing system 102 may retrieve, organize, and display or populate contextual information at that breakpoint, such as a data lineage and a status of data prior to the breakpoint (e.g., immediately prior to execution of the transformed script at that breakpoint), statuses and values of, and/or interactions between, components such as widgets, functions, arguments, queries, and/or events, and dependencies among such components as well as other portions of the program and/or other breakpoints. Queries may define particular portions of data or particular datasets to retrieve from data sources (e.g., the database 130).

The implementation 100 can include at least one computing device 104 which may be operated by an entity such as a user. The user may submit a prompt or a request (hereinafter "request") 120 through the computing device 104. The computing device 104 may receive the request from a user or from another computing device, computing process, or pipeline. Such a request may relate to operations on or pertain to execution of a program or a script (hereinafter "script") 121, or a portion thereof. The script 121 may include a function, multiple functions, a program, or a portion thereof. The script 121 may be executed by the logic 113 and converted to an executable format, such as an executable script 122. The script 121 may be manifested in multiple different programming languages. Following execution of the executable script 122, the computing system 102 may store a portion or all of the results from executing the executable script 122, and/or associated contextual information, such as information from a debugging or error correction process or session, in a database 130. In general, the user can interact with the database 130 directly or over a network 106, for example, through one or more graphical user interfaces, application programming interfaces (APIs), and/or webhooks. The computing device 104 may include one or more processors and memory. In some examples, the computing device 104 may visually render any outputs from the execution and/or debugging process.

The script 121 may be executed on the computing system 102 and/or on the computing device 104. In some examples, whether the script 121 is executed on the computing system 102 or on the computing device 104 depends on a type of script. Functions may be executed on the computing device 104, while queries may be executed on the computing system 102.

The computing system 102 may include one or more processors 103 which may be configured to perform various operations by interpreting machine-readable instructions, for example, from a machine-readable storage media 112. In some examples, one or more of the processors 103 may be combined or integrated into a single processor, and some or all functions performed by one or more of the processors 103 may not be spatially separated, but instead may be performed by a common processor. The processors 103 may be physical or virtual entities. For example, as virtual entities, the processors 103 may be encompassed within, or manifested as, a program within a cloud environment. The computing system 102 may also include a storage 114, which may include a cache for faster access compared to the database 130.

The processors 103 may further be connected to, include, or be embedded with logic 113 which, for example, may include, store, and/or encapsulate instructions to be performed. In general, the logic 113 may be implemented, in whole or in part, as software that is capable of running on the computing system 102, and may be read or executed from the machine-readable storage media 112. The logic 113 may include, as nonlimiting examples, parameters, expressions, protocols, evaluations, conditions, and/or code. Here, in some examples, the logic 113 carries out execution of at least a portion of an executable script, terminating or pausing the execution at a provided breakpoint, and providing a visual and/or pictorial depiction of statuses and/or values of any components associated with the breakpoint and/or of the executable script, such as, a call stack, data (e.g., datasets), widgets, arguments, functions, queries, variables, and/or events. Operations described with respect to the logic 113 may be associated with a single processor or multiple processors. Operations within the logic 113 will be subsequently described, following a description of the database 130.

The database 130 may include or store, or be capable of obtaining or retrieving, information such as raw data or raw datasets to be operated upon and retrieved by queries. In some examples, the database 130 may also separately store information or details regarding and/or related to execution and/or debugging of the executable script 122. This information may be code-based and/or pictorially based, such as, including any visual outputs generated from the debugging of the executable script 122, which will be described in the subsequent FIGS. The database 130 may further include information of any components that cause a bug or an error, and/or suggested or implemented corrections to such components. The database 130 may further include information regarding a call stack. The database 130 may further include any functions and/or libraries, and definitions of such functions, to be called in executing the executable script 122. In some examples, the implementation 100 may include multiple databases from which information is retrieved by the logic 113, instead of a single database.

The logic 113 may be configured to perform processing and/or analysis functions by ingesting, obtaining, or receiving the request 120. The request 120 may relate or pertain to execution of code within the script 121, or a portion thereof. The logic 113 may convert the script 121 into the executable script 122 if the script 121 is not in an already executable format. The logic 113 may obtain an indication of any breakpoints, either from the request 120 or separately. The breakpoints may include, for example, a specific line of code, and/or correspond to an event, an action, a widget, a variable, or a function. In some examples, breakpoints may be limited to being set between scripts or components. A breakpoint corresponding to an event may include an event listener, for example, which may detect an event such as a user interaction event (e.g., a mouse being clicked, a mouse being scrolled, a mouse dragging operation, a cursor being moved, a keystroke on a keyboard, a disk input/output (I/O) operation, network activity, an internal timer, or an interrupt). The event may be applied on a particular element, such as a Document Object Model (DOM) element. A breakpoint corresponding to an action may refer to an action that is performed in response to the event, or unrelated to the event. A breakpoint corresponding to a widget may pause execution immediately before the widget commences execution, or during execution of the widget. A breakpoint corresponding to a variable may pause execution when, or immediately before, a particular variable is read or written into, or its value changed to a particular value. A breakpoint corresponding to a function may pause execution at a point in which, or immediately before, the function is called, or invoked, for example, by a pointer. In some examples, a breakpoint may be positioned immediately before, or within, a loop. If the breakpoint is positioned within the loop, the logic 113 may output a visual or pictorial depiction of values at every iteration of the loop.

The logic 113 may, during and/or after execution of the executable script 122, generate, render, populate, and/or initiate a debugging window 140 which may display visual outputs and/or receive inputs during a debugging process. A debugging functionality may work across different environments such as the computing system 102 and/or the computing device 104. The debugging window 140 may include a toggle 141, which may switch the debugging window 140 on or off. Furthermore, the debugging window 140 may show locations and/or criteria of any received or obtained breakpoints. For example, in FIG. 1A, breakpoints 142, 144, 146, 148, 150, and 152 may have been set by a user, for example, via the computing device 104. The breakpoints 142, 144, 146, 148, 150, and 152 may be nodes, and may correspond to various positions in the executable script 122 or the script 121, and/or correspond to certain conditions or criteria. For example, any of the breakpoints 142, 144, 146, 148, 150, and 152 may correspond to an event, an action, a widget, a variable, or a function.

The logic 113 may generate an interface 160 to display or populate contextual information regarding each of the breakpoints 142, 144, 146, 148, 150, and 152. The interface 160 may include a search bar 182, a first menu 184 which may include a list of first components such as events, actions, widgets, variables, and/or functions encompassed with the script 121 or the executable script 122, and a second menu 186 which may include a list of second components 190, 191, 192, 193, 194, and 195 that actually correspond to the breakpoints 142, 144, 146, 148, 150, and 152. Alternatively, the first menu 184 and/or the second menu 186 may be limited to widgets and/or functions. For example, the second components 190, 191, 192, 193, 194, and 195 may indicate positions at which the executable script 122 is paused or terminated. Specifically, the second component 190 may be a widget at which, or immediately before which, the executable script 122 terminates or pauses. The second component 191 may be an event at which, or immediately before which, upon detection, the executable script 122 terminates or pauses. The second components 192 and 193 may be widgets at which, or immediately before which, upon detection, the executable script 122 terminates or pauses. The second component 194 may be a function which, upon being called, the executable script 122 terminates or pauses. The second component 195 may be a variable at which, upon being read into or written into or changed into a particular value, the executable script 122 terminates or pauses. The second components 190, 191, 192, 193, 194, and 195 may be a subset of the first components.

The interface 160 may include a multi-tabbed menu, in which one of the tabs may be selected. For example, if a dependencies tab 180 is selected, within a portion or a main portion (hereinafter "main portion") 161 of the interface 160 may be illustrated, graphically or pictorially, dependencies among the second components 190, 191, 192, 193, 194, and 195 within a dependency graph 181. In particular, in the main portion 161, the dependencies among the second components 190, 191, 192, 193, 194, and 195 illustrate a sequence of execution and/or data outputs and data inputs into the second components 190, 191, 192, 193, 194, and

195. The icons or representations 162, 164, 166, 168, 170, and 172 may correspond to the second components 190, 191, 192, 193, 194, and 195. In particular, the icon 162 may represent a widget that corresponds to the second component 190, the icon 164 may represent an event that corresponds to the second component 191, the icon 166 may represent an action that corresponds to the second component 192, the icon 168 may represent an action that corresponds to the second component 193, the icon 170 may represent a function that corresponds to the second component 194, and the icon 172 may represent a variable that corresponds to the second component 195.

For example, a data output from or associated with the second component 190, as represented by the icon 162, may be fed, either directly or following further manipulation or processing, as a data input into the second component 191, as represented by the icon 164. A data output from or associated with the second component 191 (e.g., an indication that an event occurred), as represented by the icon 164, may be fed, either directly or following further manipulation or processing, as a data input into either or both of the second component 166 and/or the second component 168. A data output from or associated with the second component 192 (e.g., data following an action performed by the second component), as represented by the icon 166, may be fed, either directly or following further manipulation or processing, as a data input into the second component 194. For example, this data input may include an argument of a function that is called or invoked by a pointer, and/or an input to be transformed or manipulated by the function. A data output from or associated with the second component 194 (e.g., following execution of the function) may be fed, either directly or following further manipulation or processing, as a data input into the second component 195, represented by the icon 172. For example, this data input may indicate how a value of a variable changes.

Figure 1B:
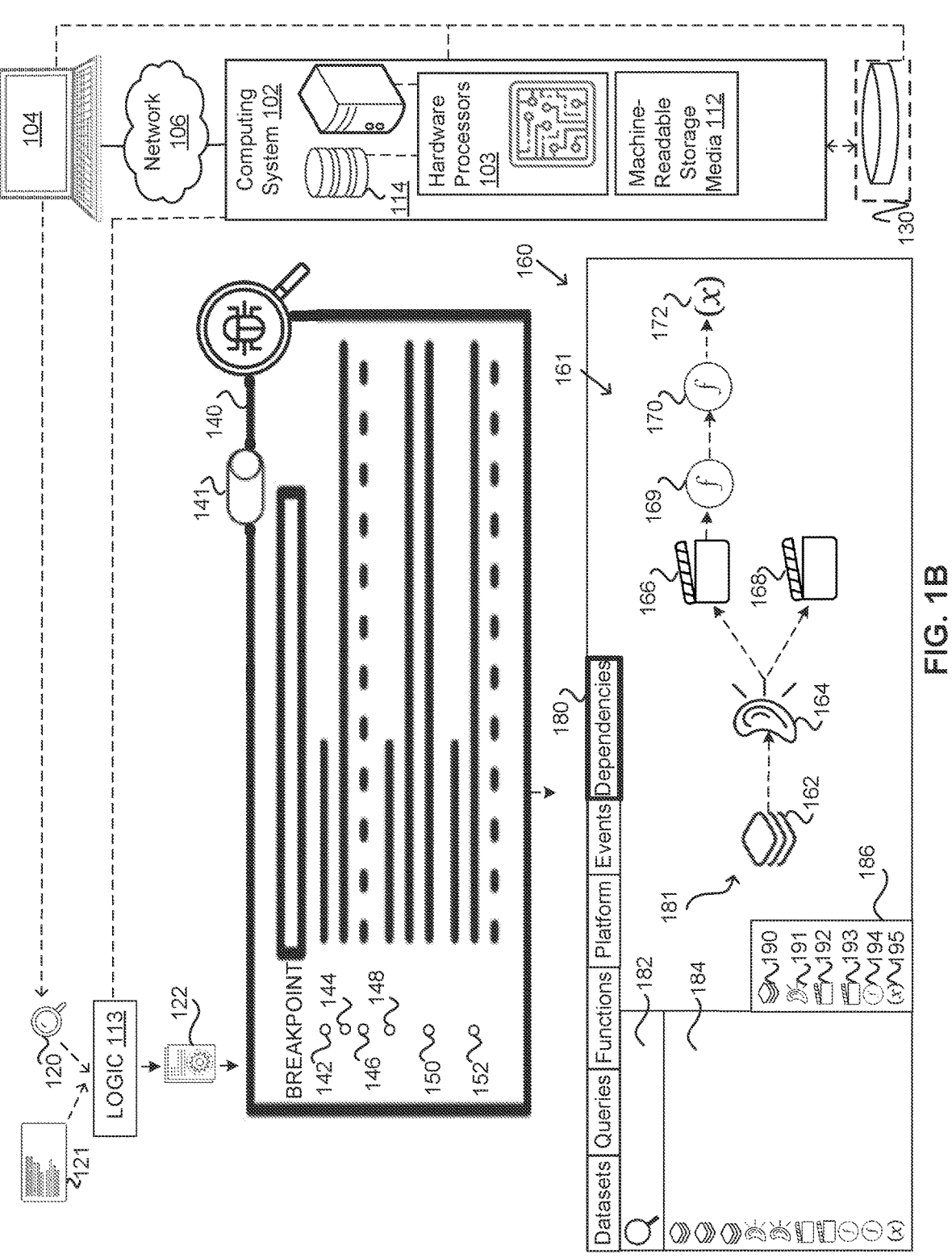
FIG. 1B illustrates an example implementation of a computing system that generates and/or displays an updated window illustrating details of a debugging process, following an update to a script to be executed.

FIG. 1B illustrates that as the executable script 122 is updated, or a program to be executed is otherwise modified or updated, the dependency graph is accordingly updated. For example, upon receiving an indication of a new function, and/or a new breakpoint at the new function or at an existing function, the logic 113 may update the dependency graph. As illustrated, the logic 113 may update the dependency graph with a new function 169, and indicate a new breakpoint at the new function 169. Additional contextual information, such as that illustrated in FIGS. 4-5, may also be updated.

Figure 2:
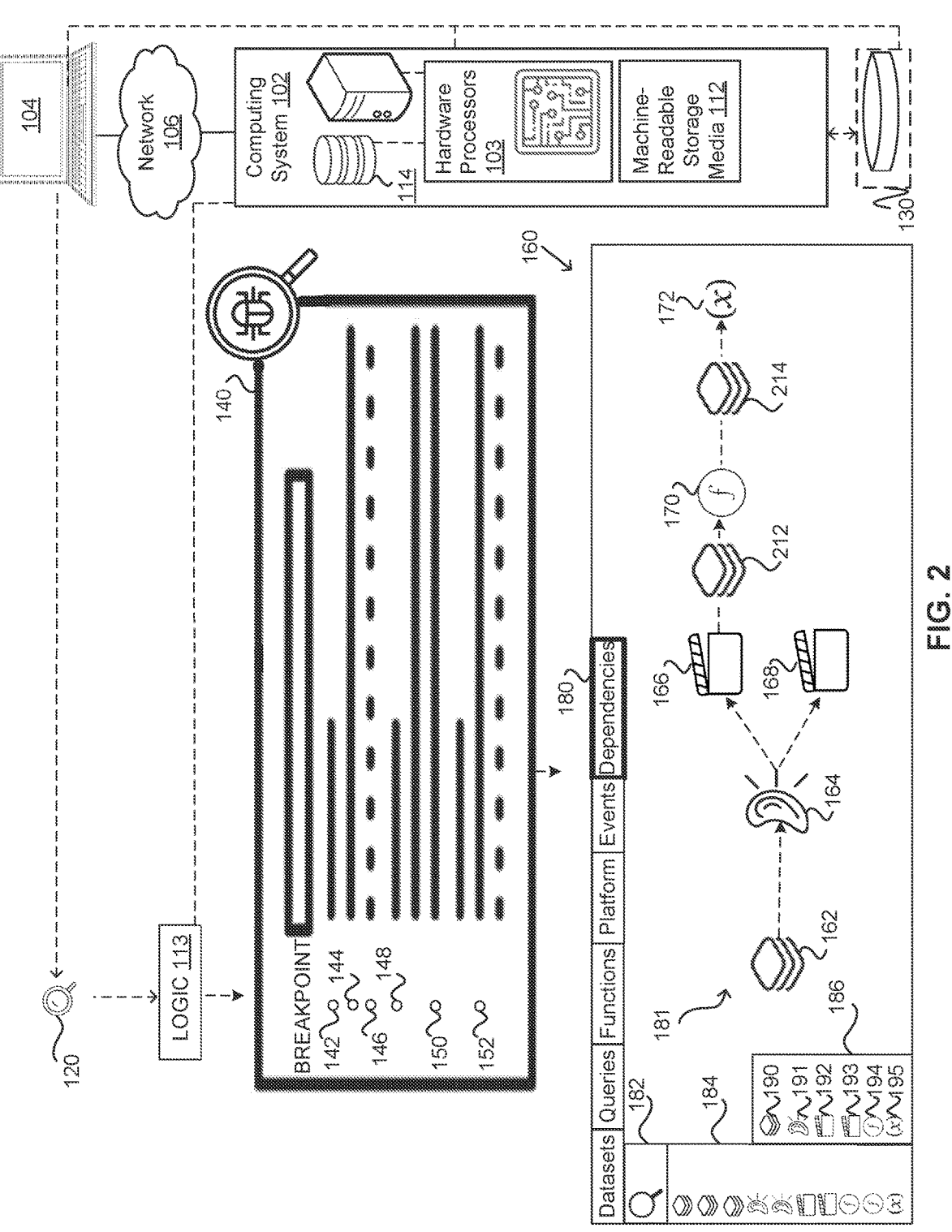
FIG. 2 illustrates an example implementation of a computing system that generates and/or displays a window illustrating details of a debugging process, such as dependencies among components which may or may not correspond to breakpoints.

In FIG. 1A and FIG. 1B, the main portion 161 of the interface 160 may be limited to illustrating only dependencies among nodes that correspond to the breakpoints 142, 144, 146, 148, 150, and 152. Alternatively, as illustrated in FIG. 2, dependencies among nodes, including those that do not correspond to the breakpoints 142, 144, 146, 148, 150, and 152, may also be shown. For example, an icon 212 representing a first particular widget, may illustrate that data passes between the second component 192, to the first particular widget, and to the second component 194, rather than directly passing from the second component 192 to the second component 194. However, the particular widget may not correspond to any of the breakpoints 142, 144, 146, 148, 150, and 152, so execution continues through the first particular widget. Additionally, an icon 214 representing a second particular widget, may illustrate that data passes between the second component 194, to the second particular widget, and to the second component 195, rather than directly passing from the second component 194 to the second component 195.

Figure 3:
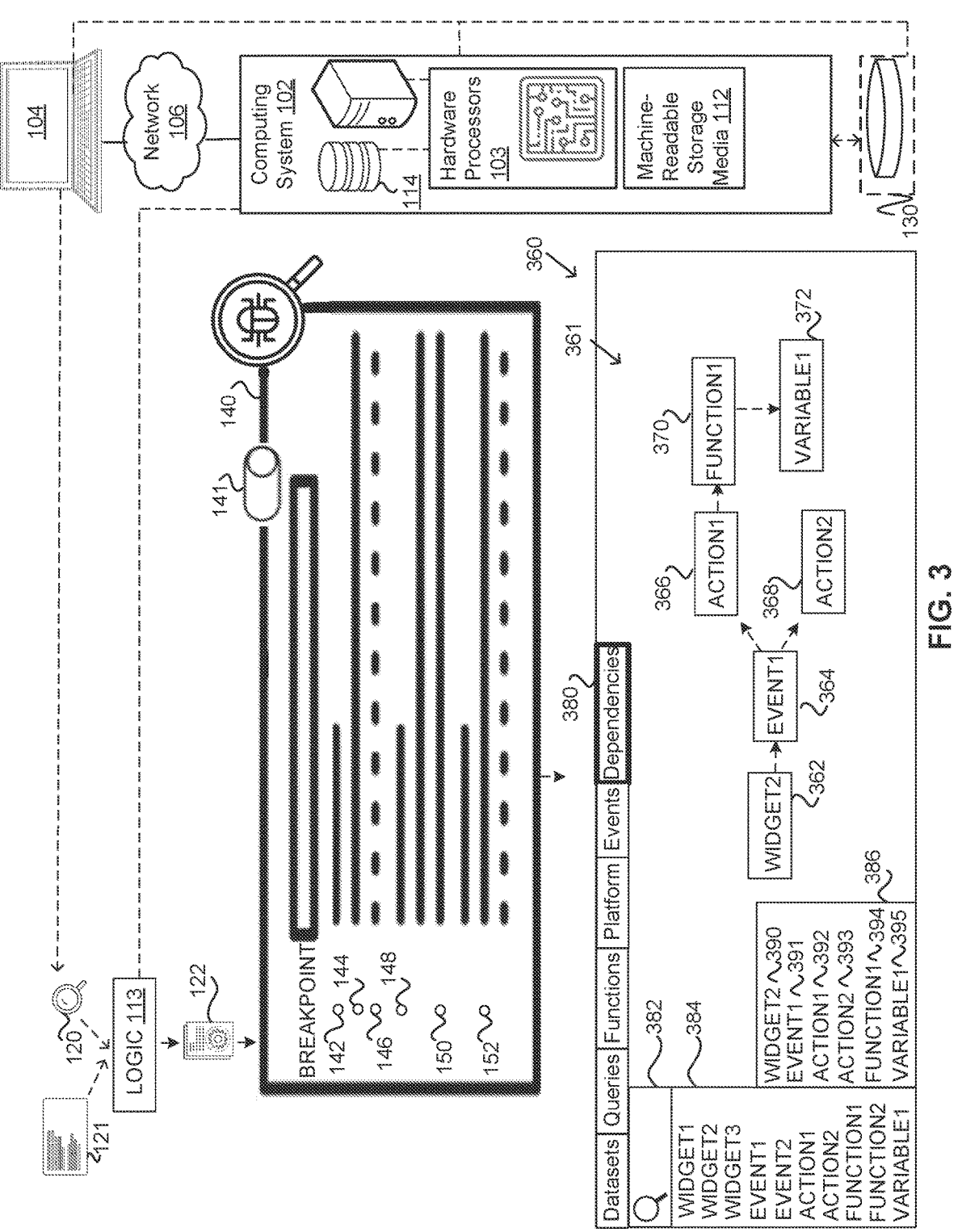
FIG. 3 illustrates an example implementation of a computing system, corresponding to FIG. 1A, that generates and/or displays a window illustrating details of a debugging process, in which icons are displayed visually rather than pictorially.

In FIG. 3, the components may be displayed textually rather than pictorially, as in FIGS. 1A and 2. Thus, FIG. 3 may be similar or analogous to FIG. 1A, but the components may be shown in text rather than in icon or picture format. The logic 113 may generate an interface 360 to display or populate contextual information regarding each of the breakpoints 142, 144, 146, 148, 150, and 152. The interface 360 may include a search bar 382, a first menu 384 which may include a list of first components such as events, actions, widgets, variables, queries, and/or functions encompassed with the script 121 or the executable script 122, and a second menu 386 which may include a list of second components 390, 391, 392, 393, 394, and 395 that actually correspond to the breakpoints 142, 144, 146, 148, 150, and 152. The second components 390, 391, 392, 393, 394, and 395 may be implemented as the second components 190, 191, 192, 193, 194, and 195, respectively.

The interface 360 may include a multi-tabbed menu, in which one of the tabs may be selected. For example, if a dependencies tab 380 is selected, within a main portion 361 of the interface 360 may be illustrated, diagrammatically, dependencies among the second components 390, 391, 392, 393, 394, and 395. In particular, in the main portion 361, the dependencies among the second components 390, 391, 392, 393, 394, and 395 illustrate a sequence of execution and/or data outputs and data inputs into the second components 390, 391, 392, 393, 394, and 395. The icons or representations 362, 364, 366, 368, 370, and 372 may correspond to the second components 390, 391, 392, 393, 394, and 395.

Figure 4:
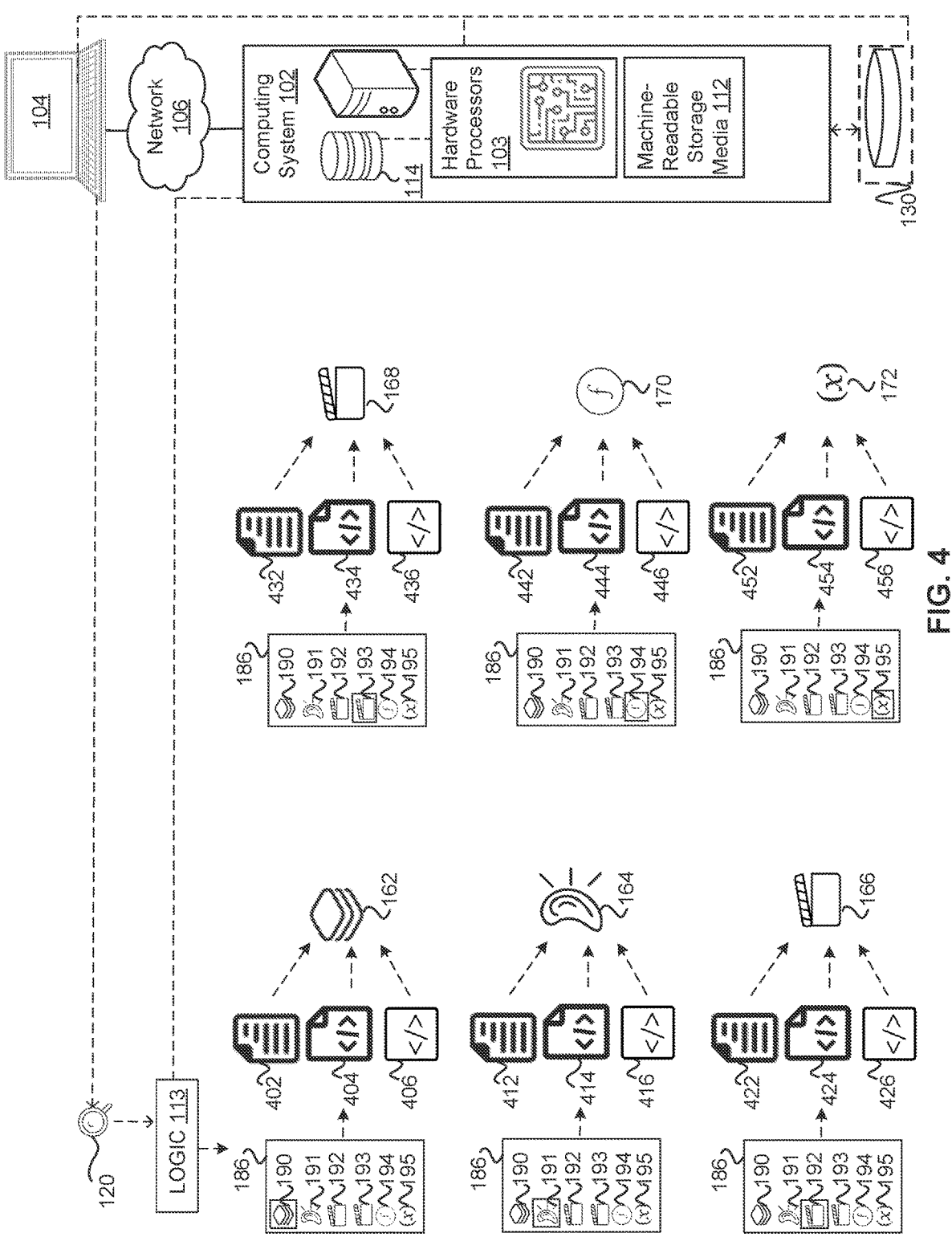
FIG. 4 illustrates an example implementation of further contextual information to be illustrated within the window or a different window, and corresponds to FIG. 1A.

FIG. 4 illustrates further contextual information to be illustrated within the interface 160, and corresponds to the implementation 100 of FIG. 1A. In some examples, this contextual information may be presented onto the interface 160, for example, adjacent to the dependency graph 181 or overlaid over portions of the dependency graph 181. The contextual information may be presented for any or all of the second components 190, 191, 192, 193, 194, and 195. The contextual information may include any of data (e.g., datasets) to be passed into one of the second components 190, 191, 192, 193, 194, and 195, arguments (e.g., expressions or functions to be passed or supplied to a command, function, procedure, or routine), and/or parameters to be passed into one of the second components 190, 191, 192, 193, 194, and 195, and/or one or more portions of code to be executed and associated with one of the second components 190, 191, 192, 193, 194, and 195. In some examples, the datasets may include not only the datasets inputted into one of the second components 190, 191, 192, 193, 194, and 195, but also a lineage or history of the datasets, including previous datasets at different stages of execution by the executable script 122, which were further transformed or manipulated. For example, the previous datasets may include an original dataset prior to execution of the executable script 122, and statuses of the datasets following transformation by various components within the executable script 122, for example, prior to the second component 190. The contextual information may further include access control attributes of any of the second components 190, 191, 192, 193, 194, and 195. The contextual information may additionally include one or more fixes or solutions for bugs, which may be generated upon receiving additional information such as a column of a dataset that has an error. The contextual information may further include information regarding a call stack. The contextual information may further include a time consumed processing each node or between nodes, which may be applicable to queries and/or functions (e.g., the second component 194). A time consumed processing each node or between nodes may refer specifically to processing of a component represented by a node, or to a time spent between a node or breakpoint and a most recent previous node or breakpoint. For queries, the time consumed may include a time on a processing server (e.g., a portion of the processors 102 that executes a portion of the executable script 122), a latency between the processing server receiving the request 120 and populating results on the interface 160, and queueing of the request 120. For functions, the time consumed may include setup and computation or execution time. Meanwhile, the contextual information may include a load time, which applies to queries and functions, and encompasses a time between the processors 102 commence execution at a first node and when a given node completes calculation.

Additionally, the contextual information may include any datasets used to train any of the second components 190, 191, 192, 193, 194, and 195, and/or particular machine learning components of the second components 190, 191, 192, 193, 194, and 195, if any of the second components 190, 191, 192, 193, 194, and 195 have machine learning features. The contextual information may additionally include any resulting datasets following a corresponding breakpoint.

In some examples, the contextual information regarding a particular component is displayed upon selection of that particular component within the second menu 186. For example, upon receiving a selection of the second component 190 within the second menu 186, the logic 113 may populate, onto the interface 160, a display of relevant contextual information of the second component 190, which is represented by the icon 162. This contextual information may include a dataset 402 that is fed into the second component 190, or otherwise associated with the second component 190. The dataset 402 may be transformed by the second component 190, or utilized to perform operations by the second component 190. The contextual information may, additionally or alternatively, include previous upstream datasets at different stages of execution by the executable script 122 which, following transformation or manipulation, resulted in the dataset 402. The contextual information may also include any arguments or parameters (hereinafter "arguments") 404 passed into the second component 190, such as, arguments or parameters passed into any functions within the second component 190, to execute the second component 190, and/or code 406 (e.g., computer code, instructions, logic, or protocols) associated with the second component 190. The arguments 404 may provide specific protocols regarding a transformation of a dataset. The contextual information may further include a resulting dataset outputted following the breakpoint 142, after execution by the second component 190 or a portion of the second component 190 following the breakpoint 142.

By populating contextual information onto the interface 160, the logic 113 may facilitate debugging or error detection by elucidating information that may be attributed to a root cause of a bug or error, on a single interface. The contextual information, displayed either adjacent to or overlaid upon a dependency graph, may facilitate pinpointing a bug or an error. Therefore, a need to switch among different interfaces in order to discover contextual information is obviated. Additionally, potential downstream errors may also be detected before execution, thereby saving computing resources by obviating the need to reexecute programs. For example, an erroneous portion of the code 406, or an erroneous argument or parameter within the arguments 404, and/or an erroneous portion of the dataset 402, may be detected and rectified. Moreover, a bug or error associated with a downstream component (e.g., the second component 191) may be attributed to a finite number of possible causes, such as contextual information of upstream components (e.g., the datasets 402, the arguments 404, or the code 406).

Upon receiving a selection of the second component 191 within the second menu 186, the logic 113 may populate, onto the interface 160, a display of relevant contextual information of the second component 191, which is represented by the icon 164. This contextual information may include a dataset 412 that is fed into the second component 191, or otherwise associated with the second component 191. The dataset 412 may include an indication of various user interaction events detected, for example, by the logic 113, which may be evaluated by the second application 191 in order to determine whether an event satisfies a specified criteria defined within the second application 191. The dataset 412 may include a time of each user interaction event, a type of each user interaction event, and/or an element (e.g., a screen element or a DOM element) upon which the user interaction event was applied. The contextual information may also include any arguments or parameters (hereinafter "arguments") 414 passed into the second component 191, such as, arguments or parameters passed into any functions within the second component 191, to execute the second component 191, and/or code 416 associated with the second component 191. The arguments 414 may provide specific protocols and/or inputs regarding a detection of an event. The contextual information may further include an output following the breakpoint 144, after execution by the second component 191 or a portion of the second component 191 following the breakpoint 144. The output may include an indication that an event satisfying criteria of the second application 191 was detected. The criteria may indicate a specified type of event.

Upon receiving a selection of the second component 192 within the second menu 186, the logic 113 may populate, onto the interface 160, a display of relevant contextual information of the second component 192, which is represented by the icon 166. This contextual information may include a dataset 422 that is fed into the second component 192, or otherwise associated with the second component 192. The dataset 422 may include an indication of a specific type of event detected (e.g., within the second application 191), or some other trigger to cause an action. The dataset 422 may include a time of a user interaction event or other trigger, a type of the user interaction event or other trigger, and/or an element (e.g., a screen element or a DOM element) upon which the user interaction event or other trigger was applied. The contextual information may also include any arguments or parameters (hereinafter "arguments") 424 passed into the second component 192, such as, arguments or parameters passed into any functions within the second component 192 to execute the second component 192, and/or code 426 associated with the second component 192. The arguments 424 may provide specific protocols and/or inputs regarding how to perform an action. The contextual information may further include an output following the breakpoint 146, after execution by the second component 192 or a portion of the second component 192 following the breakpoint 146. The output may include an indication that an action was performed.

Upon receiving a selection of the second component 193 within the second menu 186, the logic 113 may populate, onto the interface 160, a display of relevant contextual information of the second component 193, which is represented by the icon 168. This contextual information may include a dataset 432 that is fed into the second component 193, or otherwise associated with the second component 193. The dataset 432 may include an indication of a specific type of event detected (e.g., within the second application 191), or some other trigger to cause an action. The dataset 422 may include a time of a user interaction event or other trigger, a type of the user interaction event or other trigger, and/or an element (e.g., a screen element or a DOM element) upon which the user interaction event or other trigger was applied. The contextual information may also include any arguments or parameters (hereinafter "arguments") 434 passed into the second component 193, such as, arguments or parameters passed into any functions within the second component 193 to execute the second component 193, and/or code 436 associated with the second component 193. The arguments 434 may provide specific protocols and/or inputs regarding how to perform an action. The contextual information may further include an output following the breakpoint 148, after execution by the second component 193 or a portion of the second component 193 following the breakpoint 148. The output may include an indication that an action was performed.

Upon receiving a selection of the second component 194 within the second menu 186, the logic 113 may populate, onto the interface 160, a display of relevant contextual information of the second component 194, which is represented by the icon 170. This contextual information may include a dataset 442 that is fed into the second component 194, or otherwise associated with the second component 194. The dataset 442 may be transformed by the second component 194, or utilized to perform operations by the second component 194. The contextual information may, additionally or alternatively, include previous upstream datasets at different stages of execution by the executable script 122 which, following transformation or manipulation, resulted in the dataset 442. The contextual information may also include any arguments or parameters (hereinafter "arguments") 444 passed into the second component 194, such as, arguments or parameters passed into any functions within the second component 194, to execute the second component 194, and/or code 446 associated with the second component 194. The arguments 444 may provide specific protocols regarding a transformation of a dataset. The contextual information may further include a resulting dataset outputted following the breakpoint 150, after execution by the second component 194 or a portion of the second component 194 following the breakpoint 150.

Upon receiving a selection of the second component 195 within the second menu 186, the logic 113 may populate, onto the interface 160, a display of relevant contextual information of the second component 195, which is represented by the icon 172. This contextual information may include a dataset 452 that is fed into the second component 195, or otherwise associated with the second component 195. The dataset 452 may include ontological information related to the second component 195 (e.g., a variable). For example, the ontological information may include an object associated with the second component 195, one or more classes under which the object is classified, and parent classes or superclasses from which the one or more classes inherit. The dataset may further include a process or function that read or wrote into, or otherwise modified, the second component 195 (e.g., the variable). The contextual information may also include any arguments or parameters (hereinafter "arguments") 454 in which the second component 195 is declared, called, accessed, or invoked. The contextual information may further include code 456 associated with the second component 195, which may indicate how a value of the second component 195 is read, written to, and/or changed.

Figure 5:
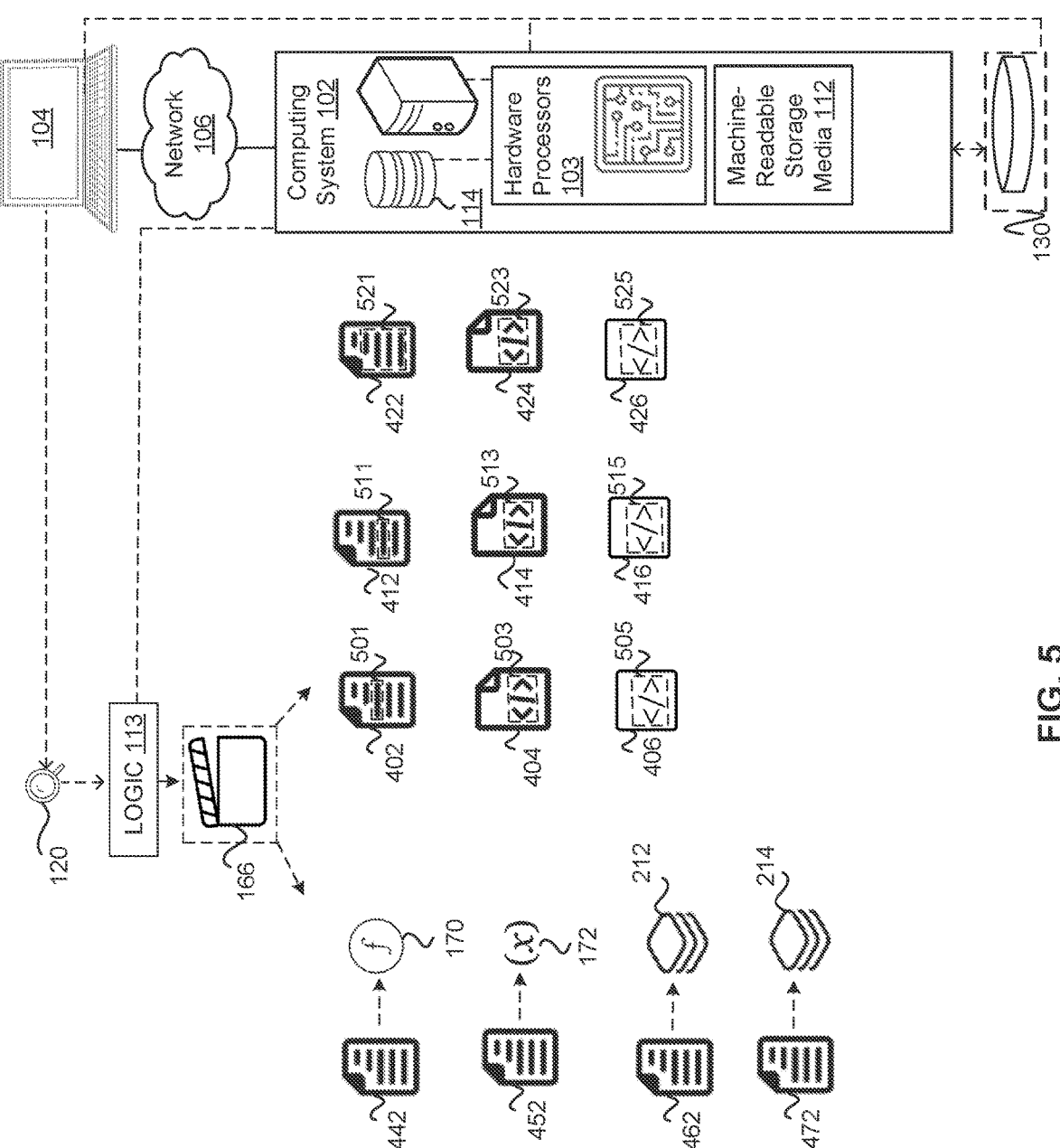
FIG. 5 illustrates an example implementation of determining any components or and/or contextual information that potentially is attributed to a bug or error.

FIG. 5 illustrates an implementation in which the logic 113 receives an indication of a bug or an error within a component. In FIG. 5, for example, the logic 113 may receive an indication from the computing device 104 regarding a bug or an error associated with a particular component, such as the second component 190, as indicated by a selection of the icon 166 that represents the second component 190. Alternatively or additionally, the logic 113 may receive an indication from the computing device 104 regarding a bug or error associated with a particular stage of execution of the executable script 122. For example, the bug or the error may be attributed to an output of the second component 190. Specifically, an output of the second component 190 may be defective and/or have an erroneous entry or value.

Upon receiving such indication, the logic 113 may determine any components and/or contextual information that would impact, or potentially would impact, an output of the second component 190, in order to facilitate a determination of a root cause of the erroneous entry or value of the output of the second component 190. For example, in FIG. 5, the logic 113 may determine that an output of the second component 190 is potentially affected by a portion 501 of the dataset 402, a portion 503 of the arguments 404, a portion 505 of the code 406, a portion 511 of the dataset 412, a portion 513 of the arguments 414, a portion 515 of the code 416, a portion 521 of the dataset 422, a portion 523 of the arguments 424, and/or a portion 525 of the code 426. The logic 113 may make such determination based on references, calls, and/or pointers to the second component 190, a subcomponent or portion of the second component 190, and/or an address of the second component 190 or a subcomponent thereof. The logic 113 may display or populate the aforementioned portions 501, 511, 521, 503, 513, 523, 505, 515, or 525 on the interface 160. In one scenario, the logic 113 may determine any possible actions that potentially caused a variable to update. Additionally, the logic 113 may determine, predict, and/or simulate how an output of the second component 190 may change upon a change in any of, or any combination of, the aforementioned portions 501, 511, 521, 503, 513, 523, 505, 515, or 525. For example, the logic 113 may simulate how the second component 190 may be changed in response to a particular change in the portion 501 of the dataset 402. This particular change in the portion 501 may be received from the computing device 104. Therefore, the logic 113 facilitates testing of any potential fixes, for example, from changes in data, arguments, and/or code, to determine whether or not any of the potential fixes are effective.

The logic 113 may further determine any downstream components and/or contextual information that are affected, or potentially affected by, an erroneous output of the second component 190. For example, such affected downstream components and/or contextual information may include the dataset 442, the second component 194 as represented by the icon 170, the dataset 452, the second component 195 as represented by the icon 172, a dataset 462, the first particular widget as represented by the icon 212, a dataset 472, and the second particular widget as represented by the icon 214. The dataset 462 may be an input to the first particular widget while the dataset 472 may be an input to the second particular widget. In such a manner, the logic 113 facilitates diagnosis of any possible downstream errors that would be triggered by an erroneous output of the second component 190, thereby proactively resolving any potential bugs or errors prior to execution.

Figure 6:
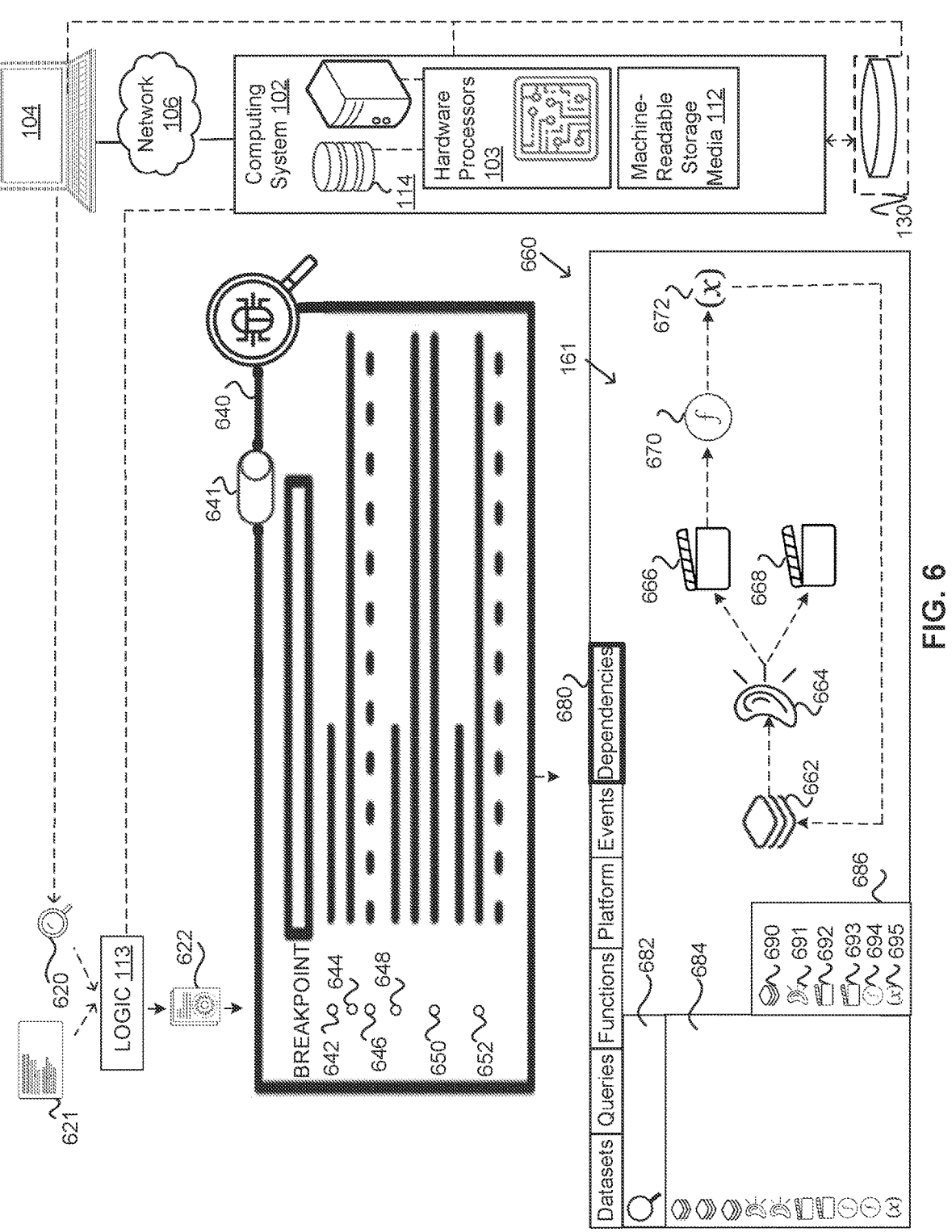
FIGS. 6-7 illustrate an example implementation of additional loop or otherwise recurring cycle to be executed from an executable script, and debugging in such a scenario.
Figure 7:
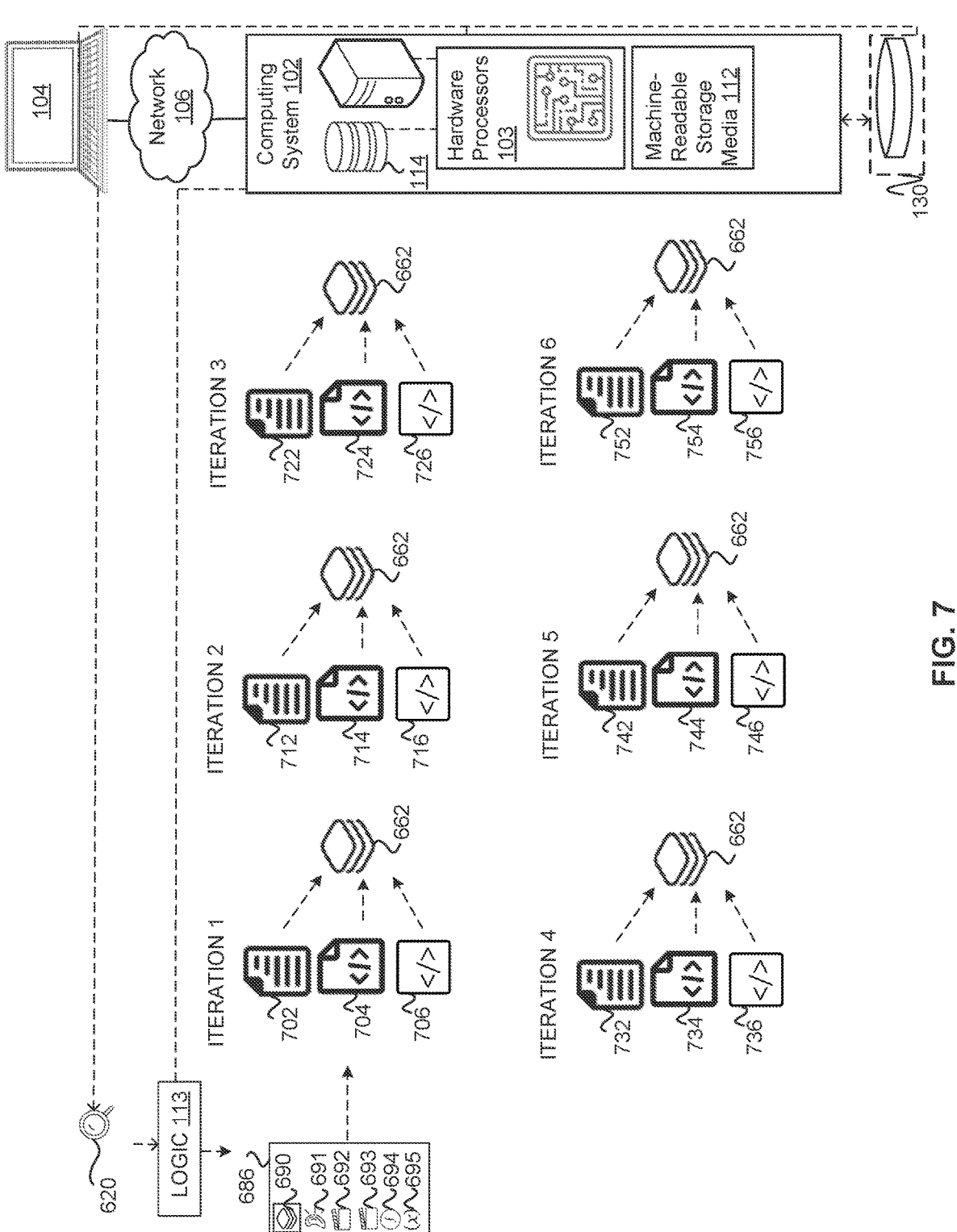

FIGS. 6 and 7 illustrate an implementation similar to FIGS. 1A and 4, with an additional loop or otherwise recurring cycle to be executed from an executable script 622. A user may submit a prompt or a request (hereinafter "request") 620 through the computing device 104. The computing device 104 may receive the request from a user or from another computing device, computing process, or pipeline. Such a request may relate to operations on or pertain to execution of a program or a script (hereinafter "script") 621, or a portion thereof. The script 621 may be executed by the logic 113 and converted to an executable format, such as the executable script 622. The script 621 may be manifested in multiple different programming languages. The interface 660 may be implemented in a similar or analogous manner as the interface 160, but in FIG. 6, an additional loop connects from an icon 672 to an icon 662, representing a function and a widget, respectively.

The logic 113 may, during and/or after execution of the executable script 622, generate, render, populate, and/or initiate a debugging window 640. The debugging window 640 may include a toggle 641, which may switch the debugging window 640 on or off. Furthermore, the debugging window may show locations and/or criteria of any received or obtained breakpoints. For example, in FIG. 6, breakpoints 642, 644, 646, 648, 650, and 652 may have been set by a user, for example, via the computing device 104. The breakpoints 642, 644, 646, 648, 650, and 652 may be nodes, and may correspond to various positions in the executable script 622 or the script 621, and/or correspond to certain conditions or criteria. For example, any of the breakpoints 642, 644, 646, 648, 650, and 652 may correspond to an event, an action, a widget, a variable, or a function.

The logic 113 may generate an interface 660 to display or populate contextual information regarding each of the breakpoints 642, 644, 646, 648, 650, and 652. The interface 660 may include a search bar 682, a first menu 684 which may include a list of first components such as events, actions, widgets, variables, and/or functions encompassed with the script 621 or the executable script 622, and a second menu 686 which may include a list of second components 690, 691, 692, 693, 694, and 695 that actually correspond to the breakpoints 642, 644, 646, 648, 650, and 652. For example, the second components 690, 691, 692, 693, 694, and 695 may indicate positions at which the executable script 622 is paused or terminated. Specifically, the second component 690 may be a widget at which, or immediately before which, the executable script 622 terminates or pauses. The second component 691 may be an event at which, or immediately before which, upon detection, the executable script 622 terminates or pauses. The second components 692 and 693 may be widgets at which, or immediately before which, upon detection, the executable script 622 terminates or pauses. The second component 694 may be a function which, upon being called, the executable script 622 terminates or pauses. The second component 695 may be a variable at which, upon being read into or written into or changed into a particular value, the executable script 622 terminates or pauses. The second components 690, 691, 692, 693, 694, and 695 may be a subset of the first components.

The interface 660 may include a multi-tabbed menu, in which one of the tabs may be selected. For example, if a dependencies tab 680 is selected, within a main portion 661 of the interface 660 may be illustrated, graphically or pictorially, dependencies among the second components 690, 691, 692, 693, 694, and 695 within a dependency graph. In particular, in the main portion 661, the dependencies among the second components 690, 691, 692, 693, 694, and 695 illustrate a sequence of execution and/or data outputs and data inputs into the second components 690, 691, 692, 693, 694, and 695. The icons or representations 662, 664, 666, 668, 670, and 672 may correspond to the second components 690, 691, 692, 693, 694, and 695. In particular, the icon 662 may represent a widget that corresponds to the second component 690, the icon 664 may represent an event that corresponds to the second component 691, the icon 666 may represent an action that corresponds to the second component 692, the icon 668 may represent an action that corresponds to the second component 693, the icon 670 may represent a function that corresponds to the second component 694, and the icon 672 may represent a variable that corresponds to the second component 695. A connection between the icon 672 and the icon 662 illustrates an iterative loop, for example, a value of a variable (e.g., the second component 695) may be passed into a widget corresponding to the icon 662 (e.g., the second component 690).

FIG. 7 illustrates that, upon a selection of the icon 662 and/or the second component 690 within the second menu 686, the logic 113 may display or populate contextual information for one or more iterations, or all iterations, of the loop illustrated in FIG. 6. For example, the contextual information may include datasets 702, arguments 704, and code 706 for a first iteration, datasets 712, arguments 714, and code 716 for a second iteration, datasets 722, arguments 724, and code 726 for a third iteration, datasets 732, arguments 734, and code 736 for a fourth iteration, datasets 742, arguments 744, and code 746 for a fifth iteration, and/or datasets 752, arguments 754, and code 756 for a sixth iteration. The aforementioned datasets, arguments, and code may be implemented in a same or similar manner as that described in FIG. 4. Therefore, the logic may facilitate troubleshooting to uncover potential errors or bugs during execution of a loop condition, and pinpoint an exact stage or iteration at which an error or bug occurs.

FIGS. 8-12 illustrate windows, outputs, or panels displayed upon selection of different tabs, such as a datasets tab, a queries tab, a functions tab, a platform tab, and an events tab, within the interface 160. In some examples, a dependency graph, and/or contextual information, as illustrated in any of FIGS. 1A, 1B, and 2-7, may be overlaid onto and/or displayed adjacent to any relevant information presented within each of the different tabs.

Figure 8:
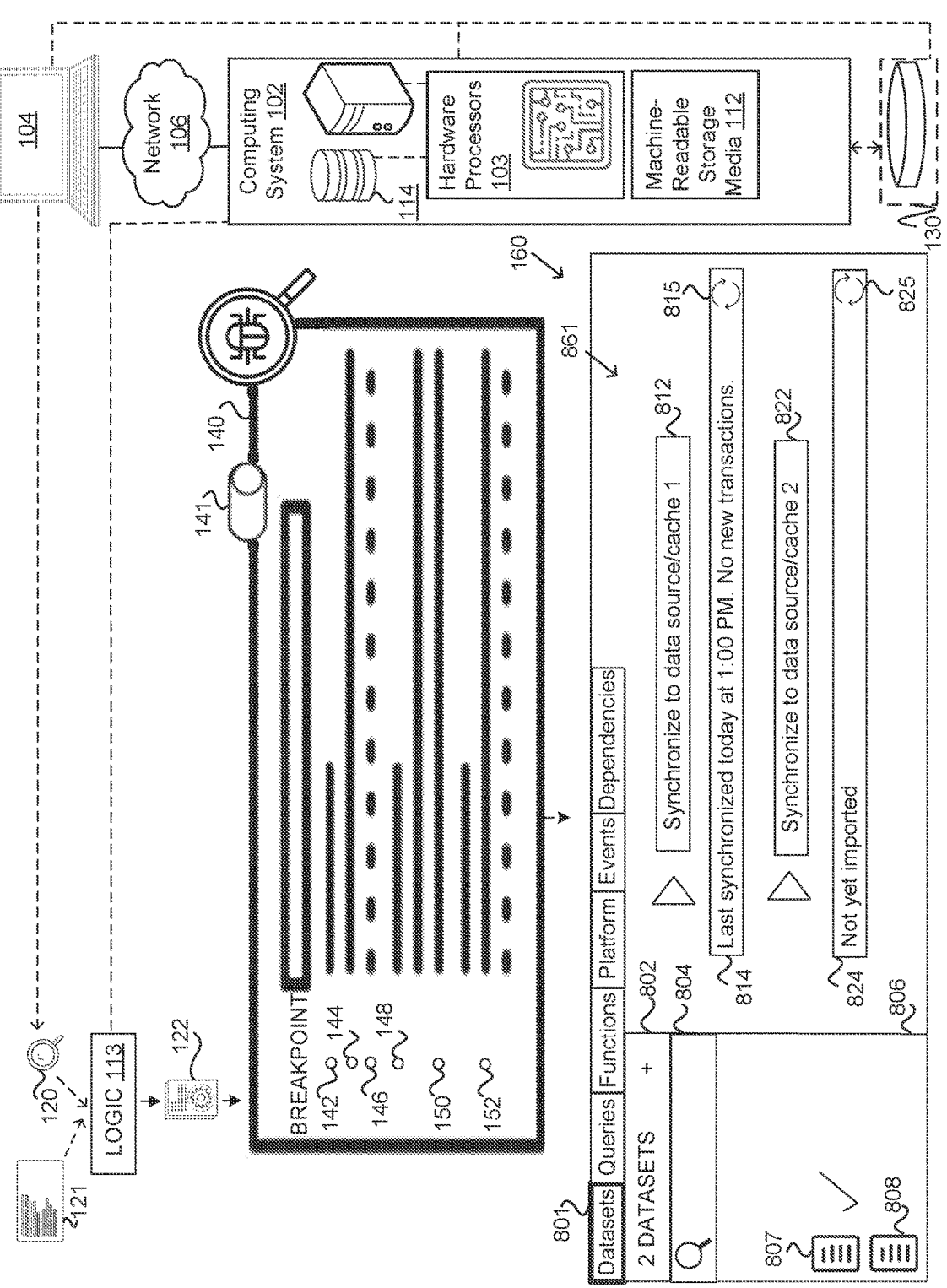
FIGS. 8-12 illustrate panels displayed upon selection of different tabs within the window. In particular.

FIG. 8 illustrates the interface 160 upon selection of a datasets tab 801. A first menu, bar or section (hereinafter "menu") 802 indicates a number of datasets that have been ingested into the database 130 and/or into the computing system 102, and are eligible for or awaiting processing or manipulation using the executable script 122. The first menu 802 may also include an option to add one or more datasets for ingestion into the database 130 and/or into the computing system 102. A second menu, bar or section 804 may include a search bar to search for specific datasets by name and/or other attributes. A third menu 806 displays the datasets that have been ingested into the database 130 and/or into the computing system 102, and are eligible for or awaiting processing or manipulation. Two such datasets are datasets 807 and 808, and the dataset 807 is illustrated as selected. Within a portion or main portion (hereinafter "main portion") 861 are boxes or buttons (hereinafter "boxes") 812 and 822, which may be selectable or clickable to synchronize the selected dataset 807 to a first data source or a first cache, or to a second data source or a second cache. The first data source may index and manage information. The first data source may track an application of user-generated edits, augment user queries using searches aggregations, and orchestrates data writeback. A status bar 814 may display a synchronization status of the selected dataset 807, and may include a refresh option 815. A status bar 824 may display a synchronization status of the selected dataset 807, and may include a refresh option 825.

Figure 9:
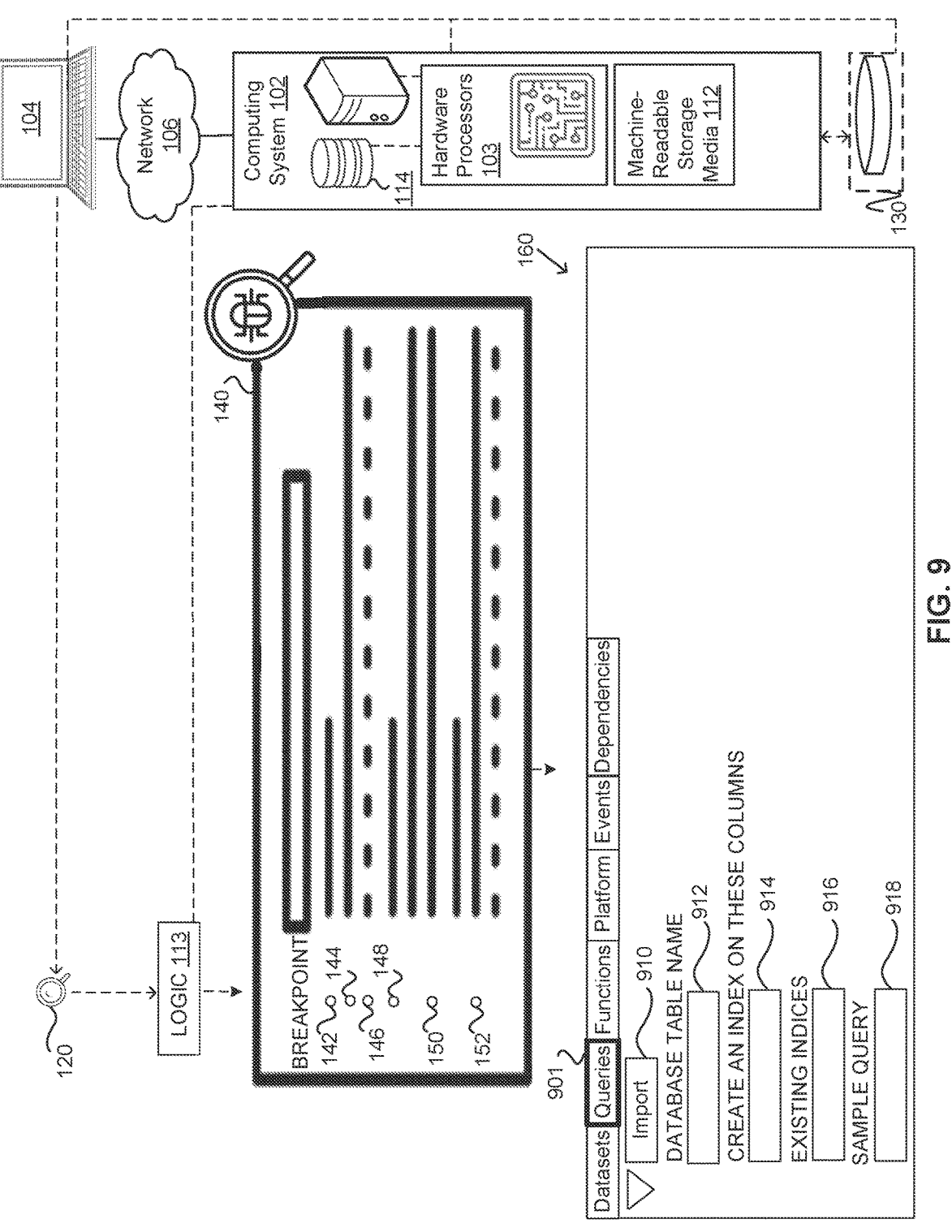

FIG. 9 illustrates the interface 160 upon selection of a queries tab 901. Upon selection of the queries tab 901, the interface 160 may populate menus or fields to permit importation of a dataset in order to query that dataset. Specifically, the interface 160 may include a menu or option 910 to import a dataset, a field 912 to receive a database table name, a field 914 to create an index on columns of the database table, a field 916 to receive existing indices, and a field 918 to populate a sample query that may be automatically generated, and used to query the dataset imported in the menu or option 910.

Figure 10:
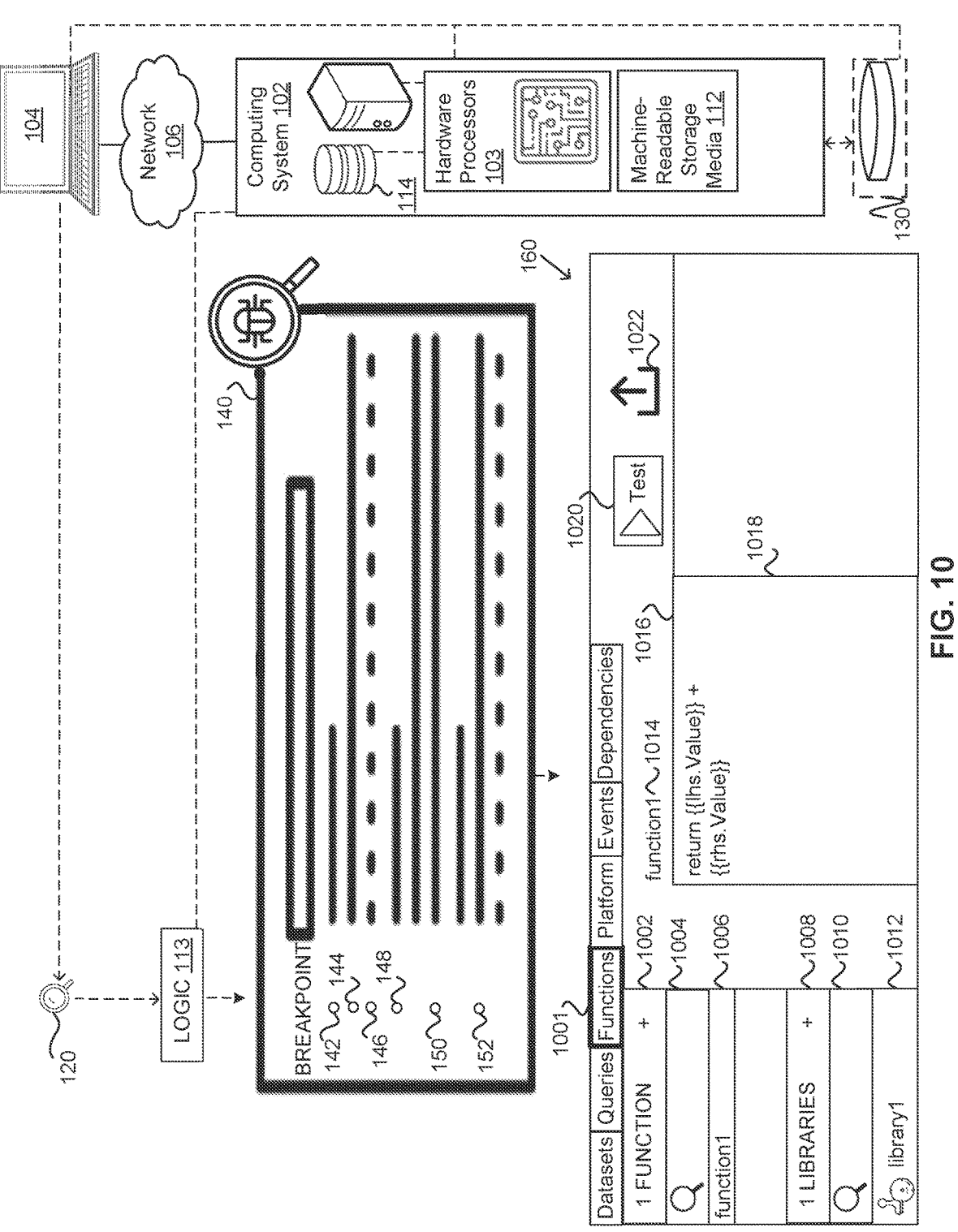

FIG. 10 illustrates the interface 160 upon selection of a functions tab 1001. Upon selection of the functions tab 1001, a first menu or section (hereinafter "menu") 1002 indicates a number of functions that have been ingested or imported into the database 130 and/or into the computing system 102, defined, and/or linked to the request 120, and are accessible or permitted to be or eligible for calling as part of executing the executable script 122. The first menu or bar (hereinafter "menu") 1002 may also include an option to add one or more functions to be defined, imported, and/or ingested into the database 130 and/or into the computing system 102. A second menu or bar 1004 may permit searching of an already defined function. A section 1006 may include or display a listing of defined functions or functions that satisfy a criteria defined in the second menu 1004. Meanwhile, a menu or section 1008 indicates a number of libraries that have been imported into the database 130 and/or into the computing system 102, defined, and/or linked to the request 120. A menu or bar (hereinafter "menu") 1010 may also include an option to add one or more libraries to be defined, imported, and/or ingested into the database 130 and/or into the computing system 102. A menu or bar 1010 may permit searching of an already defined library. A section 1012 may display or include a listing a listing of defined libraries that that satisfy a criteria defined in the menu 1010.

An area, section, or panel (hereinafter "panel") 1016 may receive an entry of a query to be evaluated. Such a query may call a function, which may include handlebars, for example, in JavaScript format. For SQL queries, handlebar templates may be enclosed by additional defined functionalities such as SQL security helpers or other helpers. An area, section, or panel (hereinafter "panel") 1018 may display a result of the query. The result may be returned in different formats, including, for example, JavaScript Object Notation (JSON) format.

Figure 11:
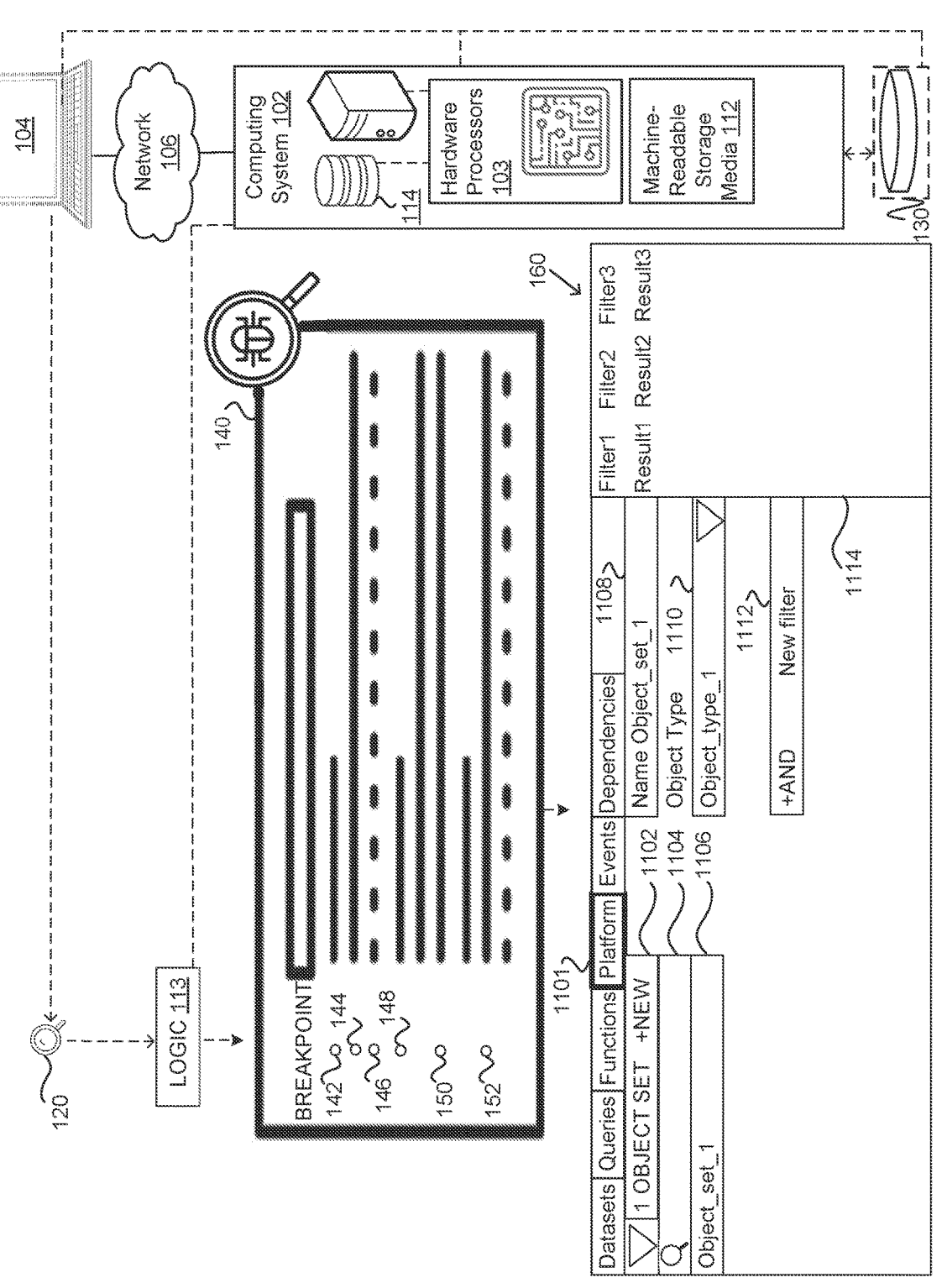

FIG. 11 illustrates the interface 160 upon selection of a platform tab or an object tab (hereinafter "platform tab) 1101. The platform tab 1101 may include one or more panels that receive one or more inputs to create or construct an object set, with or without filters, directly access one or more objects in an object set, for example, using template dot notation, access object relative identifiers (RIDs), access properties of an object, and/or create an application dependent on an object.

In one example of FIG. 11, upon selection of the platform tab 1101, a first menu or section (hereinafter "menu") 1102 indicates a number of object sets that have been defined, ingested or imported into the database 130 and/or into the computing system 102. The first menu or bar (hereinafter "menu") 1102 may also include an option to add one or more object sets to be defined, imported, and/or ingested into the database 130 and/or into the computing system 102. An object set may include any objects that satisfy an object type and one or more other filters. An object set may be manifested in a tabular format. A second menu or bar 1104 may permit searching of an already defined function. A section 1106 may include or display a listing of any defined object sets that satisfy one or more criteria defined in the second menu 1104. Meanwhile, a menu, entry or section 1108 indicates a name of a selected object set. A menu or tab 1110 may receive a selection of a particular object type. The tab 1110 may include a drop-down tab. A menu or tab 1112 may receive a new criteria, such as a filter criteria, as part of a definition of an object set. A window, section, or pane (hereinafter "section") 1114 may display a list of results that satisfy the criteria defined within the manus 1108, 1110, and 1112. The list of results may be manifested in a tabular format.

Figure 12:
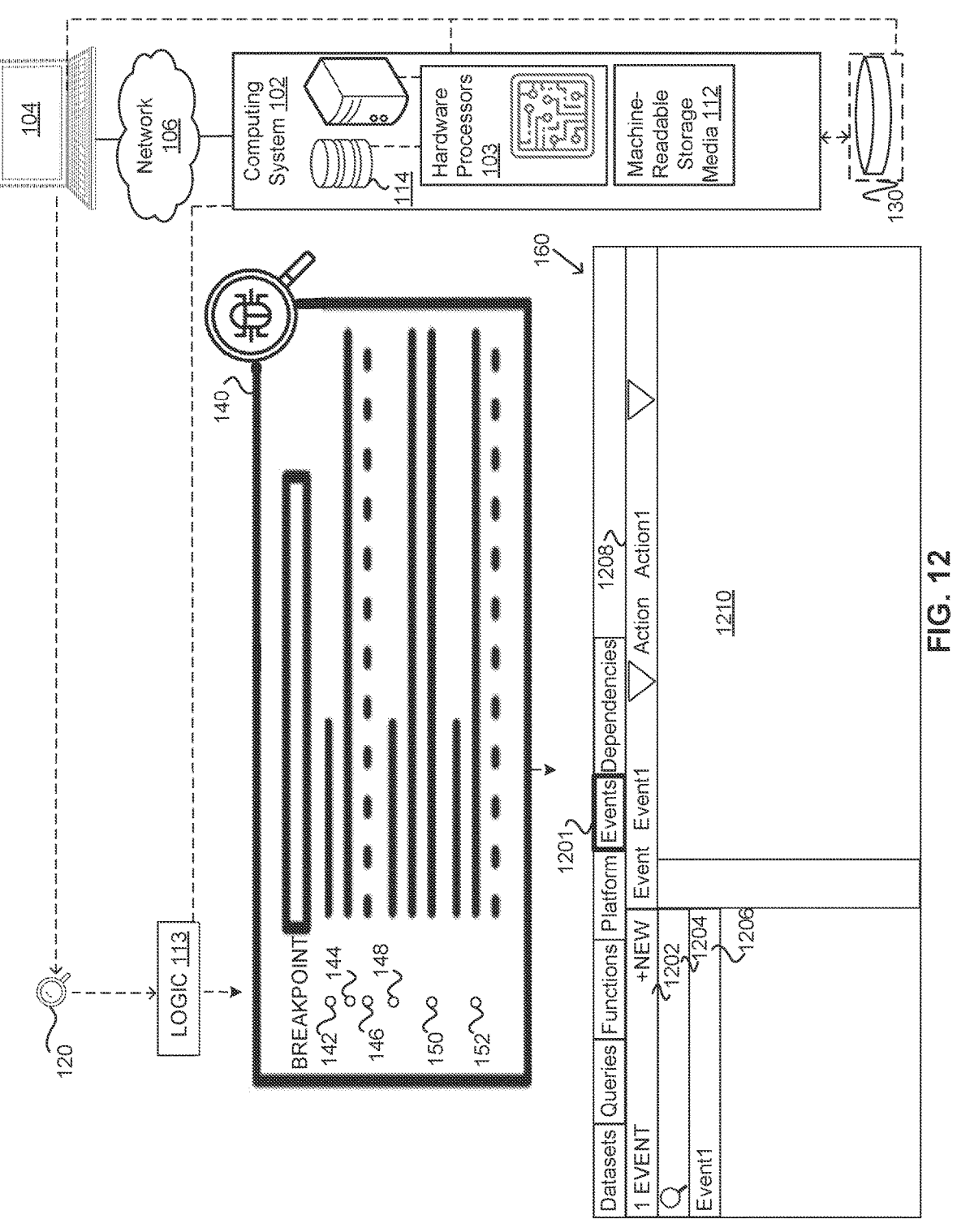

FIG. 12 illustrates the interface 160 upon selection of an events tab 1201. The events tab 1201 may include one or more panels that receive one or more inputs to trigger actions by events, receive definitions for events based on handlebar references and/or JavaScript, to control or define any values or parameters that are sent to triggered actions. For example, dialogs opening or closing, button clicks (e.g. user clicks), or query run completion or other interaction (e.g., user interaction) events may initiate and/or trigger opening and closing of toasts, running of other queries, or setting values or a variable or a parameter.

In one example of FIG. 12, upon selection of the events tab 1201, a first menu or section (hereinafter "menu") 1202 indicates a number of events that have been defined, ingested or imported into the database 130 and/or into the computing system 102, defined, and/or linked to the request 120. The first menu or bar (hereinafter "menu") 1202 may also include an option to add one or more events to be defined, imported, and/or ingested into the database 130 and/or into the computing system 102. An event may include any dialogs opening or closing, button clicks (e.g. user clicks), or query run completion or other interaction (e.g., user interaction) events. A second menu or bar 1204 may permit searching of an already defined event. A section 1206 may include or display a listing of any defined events that satisfy a criteria defined in the second menu 1204. Meanwhile, a menu, entry, tab, or section 1208 receives a selection of an event and a corresponding action, and indicates a name of a selected event and a selection action, and a mapping between the selected event and the selected action. A panel 1210 may include code to obtain a notification or indication of an event, and/or a specific action to trigger in response to receiving a positive notification or indication of the event.

Figure 13:
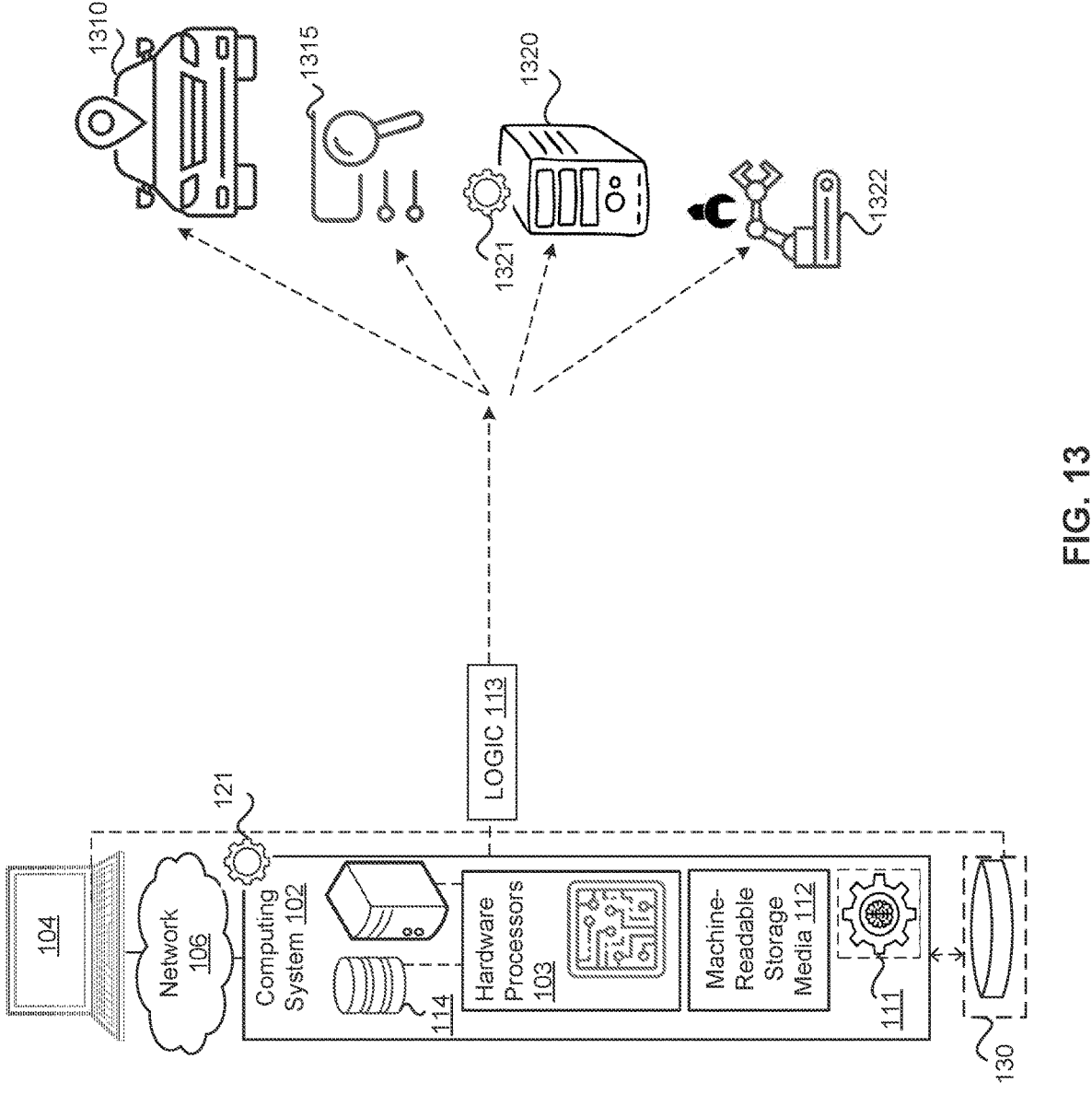
FIG. 13 illustrates a process of training, validating, and/or testing one or more machine learning components, and one or more downstream occurrences following executing of a script.

FIG. 13 illustrates a process of training, validating, and/or testing one or more machine learning components 111 within or associated with the computing system 102 to correctly perform certain functions in association with the logic 113 as described in the previous FIGS. For example, the one or more machine learning components 111 may suggest one or more corrections to resolve an error or bug, as described in FIG. 5. For instance, the one or more machine learning components 111 may determine or predict a most likely component (e.g., a function, a widget, an action, an event, or a variable) attributed to an error and/or a specific correction (e.g., code within the executable script 122) to resolve the error. The training of the one or more machine learning components 111 may be iterative, and encompass multiple stages or iterations. For example, a first stage or iteration may train the machine learning components 111 while a second stage may include examples or a corpus of training data corresponding to examples or situations in which the machine learning components 111 had highest uncertainty rates or error rates, and/or in which the machine learning components 111 made incorrect inferences. Additionally, if any inferences were outside of certain probability or confidence level thresholds, such as, for example, below 90 percent, or below 80 percent, then additional training may be conducted with respect to those situations on the machine learning components 111. Thus, subsequent iterations or stages of training may further improve or confirm outputs generated by the machine learning components 111.

Figure 14:
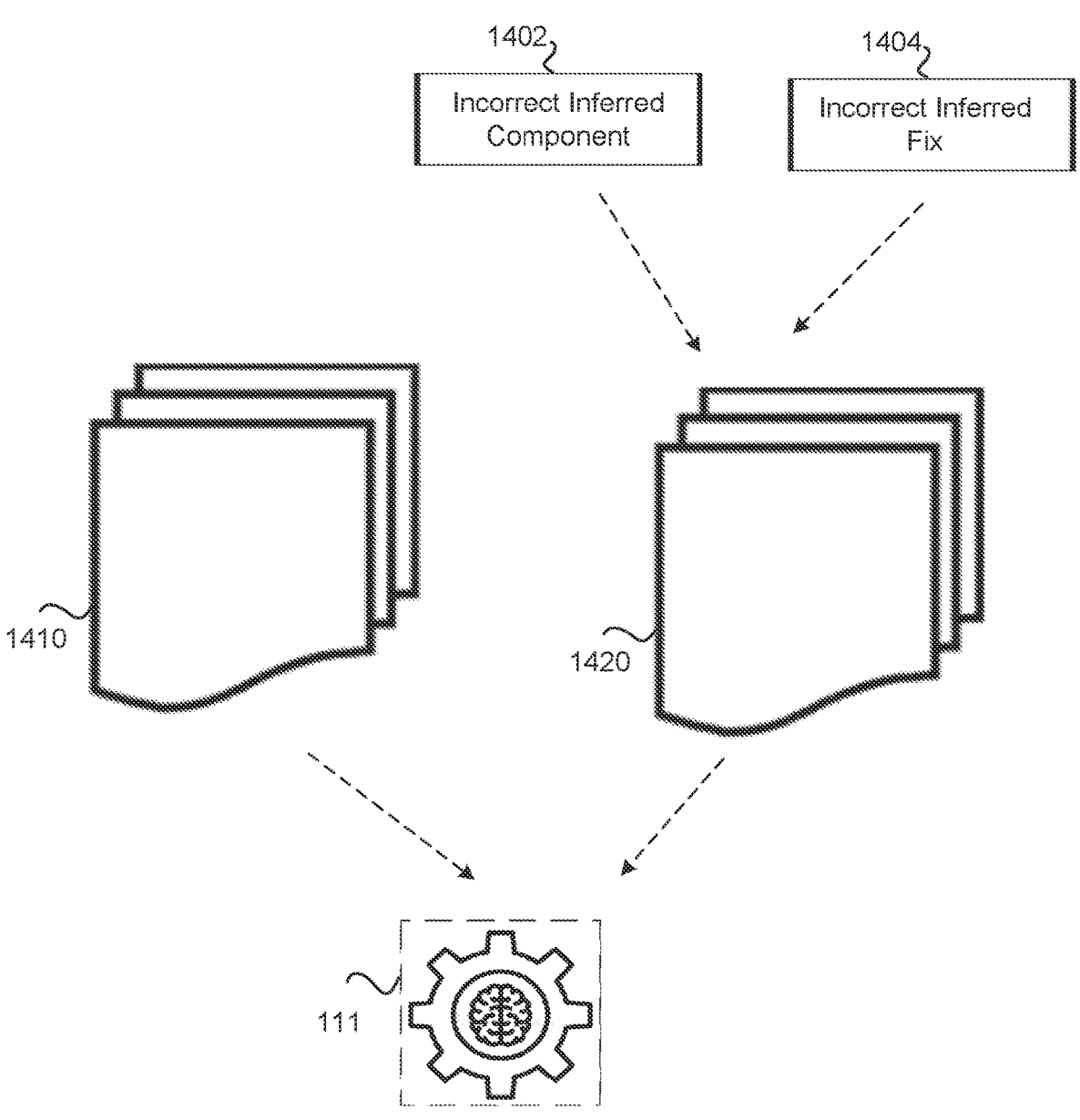
FIG. 14 is a diagram illustrating details of iterative training of machine learning components.

Specifically, as will be further illustrated in FIG. 14, examples 1402 in which the machine learning components 111 previously incorrectly inferred a component attributed to an error and examples 1404 in which the machine learning components 111 incorrectly inferred a fix to resolve the error, may be compiled and fed to the machine learning components 111 for training. An incorrect inference of a component attributed to an error may encompass a situation where, for example, an error in a particular widget was actually associated with a bug, but the machine learning components 111 either failed to identify the particular widget or identified a different widget that in fact did not cause or affect the bug. An incorrect inference may include a false positive detection or a false negative detection. An incorrect inferred fix may encompass a situation in which the machine learning components identified an incorrect portion or a subcomponent of a component attributed to an error, and/or predicted a change in code that would not have actually resolved a bug. Thus, subsequent iterations or stages of training may further improve or confirm outputs generated by the machine learning components 111.

As a result of training of the machine learning components 111 and outputs of ontological objects, attributes, and/or links generated from the computing system 102, in particular, by the logic 113, certain downstream actions may be triggered, by execution of the executable script 122 and successful debugging. These actions may include performing navigation 1310, additional monitoring 1315, transmitting and/or writing information to a different computing system 1320, for example, via an API 1321, and/or maintenance or other physical operations 1322. As an example of the additional monitoring 1315, assume that the logic 113, and/or machine learning components 111, may infer or determine attributes or parameters associated with one or more objects, such as bandwidth, speed, and/or throughput of a wireless networks, or devices or machines associated with a wireless network. If one, or any of, the attributes or parameters fall outside of operating ranges or thresholds, then the logic 113, or a different computing system, may trigger an alert, and/or may initiate additional monitoring or recording of the attributes or parameters, and/or of different attributes or parameters such as delay, packet loss, or jitter. In other examples, the logic 113 may, additionally or alternatively, trigger monitoring or recording of other entity types, such as, other devices, such as network devices or client devices that may be affected by the attributes or parameters. This monitoring or recording of other entity types may be delegated to a different processor. In other examples, a downstream action may include a transmission or presentation of information, an alert, and/or a notification to the to the computing device 104 and/or to other devices. The information may include indications of which attributes or parameters fall outside of operating ranges or thresholds, or reasons that an alert was triggered, and/or one or more timestamps corresponding to an originating or creation time of underlying data that caused the triggering of the alert. Alternatively, an alert may be triggered using a predicted time at which an attribute or parameter may be predicted to fall outside of an operating range or threshold.

In yet other examples, a downstream action may entail an applications programming interface (API) 121 of the computing system 102 interfacing with or calling the API 1321 of the different computing system 1320. For example, the different computing system 1320 may perform modification of data. The modification may encompass creating, editing, or removing entities or links, and/or adjusting attributes or parameters that are falling outside of an operating range or threshold, through some electronic or physical operation.

FIG. 14 illustrates an example implementation of training of the machine learning components 111. As described previously, for example, with respect to FIG. 13, the machine learning components 111 may be initially trained using a first training dataset 1410, and subsequently trained using a second training dataset 1420. The second training dataset 1420 may include the scenarios or examples 1402 and 1404 previously described in FIG. 13. For example, training using the second training dataset 1420 may occur following a set of inferences by the machine learning components 111.

Figure 15:
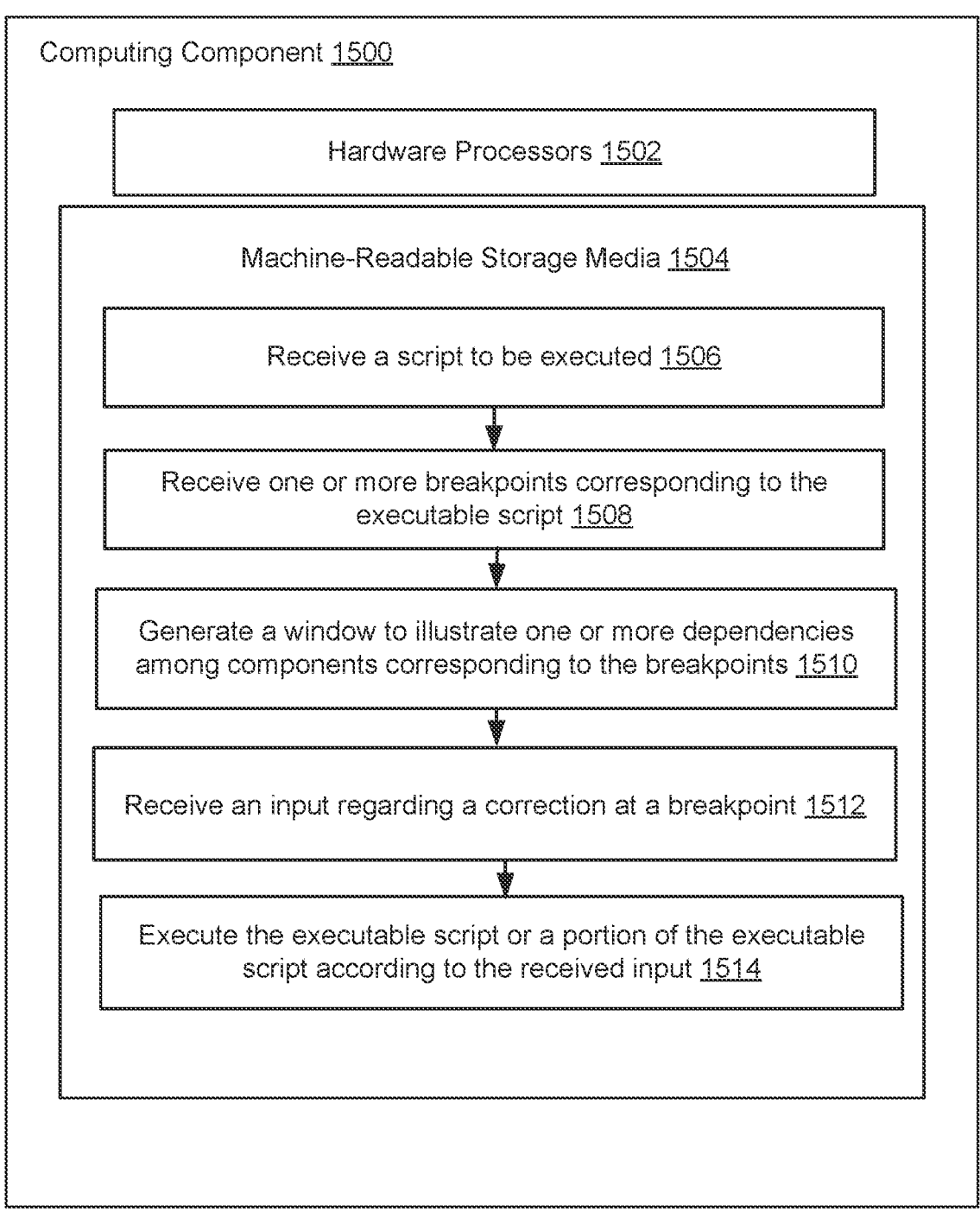
FIG. 15 illustrates a flowchart of an example method consistent with FIGS. 1A, 1B, 2-14.

FIG. 15 illustrates a computing component 1500 that includes one or more hardware processors 1502 and machine-readable storage media 1504 storing a set of machine-readable/machine-executable instructions that, when executed, cause the hardware processor(s) 1502 to perform an illustrative method of monitoring and/or initiating of downstream actions. The computing component 1500 may be implemented as the computing system 102 of FIG. 1A. The hardware processors 1502 may be implemented as the processors 103 of FIG. 1A. The machine-readable storage media 1504 may be implemented as the machine-readable storage media 112 of FIG. 1A, and may include suitable machine-readable storage media described in FIG. 16.

At step 1506, the hardware processor(s) 1502 may execute machine-readable/machine-executable instructions stored in the machine-readable storage media 1504 to receive a script (e.g., the script 121 of FIG. 1A) to be executed. Additionally, the hardware processor(s) 1502 may receive a request (e.g., the request 120) to execute the script 121, and/or perform one or more other actions such as downstream actions described, for example, in FIG. 13. If the script 121 is in a non-executable format, the script 121 may be converted, by the hardware processor(s) 1502 or by other processor(s), into an executable script (e.g., the executable script 122 of FIG. 1A).

At step 1508, the hardware processor(s) 1502 may execute machine-readable/machine-executable instructions stored in the machine-readable storage media 1504 to receive one or more breakpoints (e.g., the breakpoints 142, 144, 146, 148, 150, 152 of FIG. 1A) corresponding to the executable script.

At step 1510, the hardware processor(s) 1502 may execute machine-readable/machine-executable instructions stored in the machine-readable storage media 1504 to generate a window (e.g., the interface 160 of FIG. 1A, 1B, or 2-12) to illustrate one or more dependencies (e.g., within the dependencies tab 180) among components corresponding to the breakpoints. The components may include, for example, any of a widget, a function, an argument, a variable, a query, and/or an event. For example, the components may include the second components 190, 191, 192, 193, 194, and 195, and may be represented by the icons 162, 164, 166, 168, 170, and 172 of FIG. 1A.

At step 1510, the hardware processor(s) 1502 may execute machine-readable/machine-executable instructions stored in the machine-readable storage media 1504 to receive an input regarding a correction at a breakpoint. For example, the input may include a correction to a portion of the script 121 or the executable script 122, such as a code modification, and/or a confirmation or a rejection of a prediction from the machine learning models 111.

At step 1512, the hardware processor(s) 1502 may execute machine-readable/machine-executable instructions stored in the machine-readable storage media 1504 to execute the script, or the executable script, or a portion thereof, according to the received input. For example, the hardware processor(s) 1502 may execute up to a subsequent breakpoint, or execute until completion.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 16:
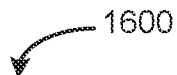
FIG. 16 illustrates a block diagram of an example computer system in which any of the embodiments described herein may be implemented.

FIG. 16 is a block diagram that illustrates a computer system 1600 upon which any of the embodiments described herein may be implemented. In some examples, the computer system 1600 may include a cloud-based or remote computing system. For example, the computer system 1600 may include a cluster of machines orchestrated as a parallel processing infrastructure. The computer system 1600 includes a bus 1602 or other communication mechanism for communicating information, one or more hardware processors 1604 coupled with bus 1602 for processing information. Hardware processor(s) 1604 may be, for example, one or more general purpose microprocessors.

The computer system 1600 also includes a main memory 1606, such as a random access memory (RAM), cache and/or other dynamic storage devices, coupled to bus 1602 for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions.

The computer system 1600 further includes a read only memory (ROM) 1608 or other static storage device coupled to bus 1602 for storing static information and instructions for processor 1604. A storage device 1610, such as a magnetic disk, optical disk, or USB thumb drive (Flash drive), etc., is provided and coupled to bus 1602 for storing information and instructions.

The computer system 1600 may be coupled via bus 1602 to a display 1612, such as a cathode ray tube (CRT) or LCD display (or touch screen), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor(s) 1604 executing one or more sequences of one or more instructions contained in main memory 1606. Such instructions may be read into main memory 1606 from another storage medium, such as storage device 1610. Execution of the sequences of instructions contained in main memory 1606 causes processor(s) 1604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1610. Volatile media includes dynamic memory, such as main memory 1606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may retrieves and executes the instructions. The instructions received by main memory 1606 may optionally be stored on storage device 1610 either before or after execution by processor 1604.

The computer system 1600 also includes a communication interface 1618 coupled to bus 1602. Communication interface 1618 provides a two-way data communication coupling to one or more network links that are connected to one or more local networks. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN (or WAN component to communicated with a WAN). Wireless links may also be implemented. In any such implementation, communication interface 1618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1618, which carry the digital data to and from computer system 1600, are example forms of transmission media.

The computer system 1600 can send messages and receive data, including program code, through the network(s), network link and communication interface 1618. In the Internet example, a server might transmit a requested code for an application program through the Internet, the ISP, the local network and the communication interface 1618.

The received code may be executed by processor 1604 as it is received, and/or stored in storage device 1610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A computing system comprising:
one or more processors; and
a memory storing instructions that, when executed by the one or more processors, cause the computing system to perform:
receiving a script to be executed;
in response to the script being in a non-executable format, converting the script into an executable script, wherein the executable script is of an executable format;
receiving one or more breakpoints corresponding to the executable script;
generating a window to illustrate one or more dependencies among components corresponding to the breakpoints, wherein the window comprises:
a plurality of tabs, wherein a first tab is configured to display or populate the one or more dependencies, a second tab is configured to populate one or more first panels upon being selected, and to receive, in the one or more first panels, one or more first inputs associated with one or more actions by events and receive one or more definitions for the events, and a third tab is configured to populate one or more second panels upon being selected, and to receive, in the one or more second panels, one or more second inputs to create or construct an object set and to display the object set according to a tabular format, wherein the object set is defined based on an object type and additional filter criteria;
receiving an input regarding a correction at a breakpoint; and
executing the executable script or a portion of the executable script according to the received input.

2. The computing system of claim 1, wherein each of the breakpoints correspond to a widget, a function, an argument, a variable, a query, and/or an event.

3. The computing system of claim 1, wherein, if a breakpoint corresponds to a variable, the executable script pauses or terminates at the breakpoint upon the variable being read into, written into, or changed in value.

4. The computing system of claim 1, wherein the computing system is associated with one or more machine learning components, and the one or more machine learning components further perform predicting one or more components attributed to an error at a breakpoint and predicting one or more specific fixes to the error at the breakpoint.

5. The computing system of claim 4, wherein the machine learning components comprise a large language model (LLM).

6. The computing system of claim 1, wherein the instructions further cause the computing system to perform:

displaying, on the first tab or on a different tab, statuses or values of data being transformed at the one or more breakpoints.

7. The computing system of claim 1, wherein the dependencies among the components comprise data inputs and data outputs at each of the components.

8. The computing system of claim 1, wherein the instructions further cause the computing system to perform:
receiving an update to the script; and
in response to receiving the update to the script, generating an updated window to illustrate one or more updated dependencies.

9. The computing system of claim 1, wherein a fourth tab, upon being selected, causes one or more fourth panels to be populated, wherein the fourth panels receive a dataset to be imported.

10. A method comprising:
receiving a script to be executed;
in response to the script being in a non-executable format, converting the script into an executable script, wherein the executable script is of an executable format;
receiving one or more breakpoints corresponding to the executable script;
generating a window to illustrate one or more dependencies among components corresponding to the breakpoints, wherein the window comprises:
a plurality of tabs, wherein a first tab is configured to display or populate the one or more dependencies, a second tab is configured to populate one or more first panels and to receive, in the one or more first panels, one or more first inputs associated with one or more actions by events and receive one or more definitions for the events, and a third tab is configured to populate one or more second panels upon being selected, and to receive, in the one or more second panels, one or more second inputs to create or construct an object set and to display the object set according to a tabular format, wherein the object set is defined based on an object type and additional filter criteria;
receiving an input regarding a correction at a breakpoint; and
executing the executable script or a portion of the executable script according to the received input.

11. The method of claim 10, wherein each of the breakpoints correspond to a widget, a function, an argument, a variable, a query, and/or an event.

12. The method of claim 10, wherein, if a breakpoint corresponds to a variable, the executable script pauses or terminates at the breakpoint upon the variable being read into, written into, or changed in value.

13. The method of claim 10, further comprising:
predicting, by one or more machine learning components, one or more components attributed to an error at a breakpoint and predicting one or more specific fixes to the error at the breakpoint.

14. The method of claim 10, further comprising:
displaying, on the first tab or on a different tab, statuses or values of data being transformed at the one or more breakpoints.

15. The method of claim 10, wherein the dependencies among the components comprise data inputs and data outputs at each of the components.

16. The method of claim 10, further comprising:
receiving an update to the script; and in response to receiving the update to the script, generating an updated window to illustrate one or more updated dependencies.

17. A non-transitory computer-readable storage medium including instructions that, when executed by at least one processor of a computing system, cause the computing system to perform a method comprising:

receiving a script to be executed;

in response to the script being in a non-executable format, converting the script into an executable script, wherein the executable script is of an executable format;

receiving one or more breakpoints corresponding to the executable script;

generating a window to illustrate one or more dependencies among components corresponding to the breakpoints, wherein the window comprises, wherein the window comprises:

a plurality of tabs, wherein a first tab is configured to display or populate the one or more dependencies, a second tab is configured to populate one or more first panels and to receive, in the one or more first panels, one or more first inputs associated with one or more actions by events and receive one or more definitions for the events, and a third tab is configured to populate one or more second panels upon being selected, and to receive, in the one or more second panels, one or more second inputs to create or construct an object set and to display the object set according to a tabular format, wherein the object set is defined based on an object type and additional filter criteria;

receiving an input regarding a correction at a breakpoint; and executing the executable script or a portion of the executable script according to the received input.

\* \* \* \* \*